US011632913B2

(12) United States Patent
Cooley

(10) Patent No.: US 11,632,913 B2
(45) Date of Patent: Apr. 25, 2023

(54) PLANT-GROWING TRAY

(71) Applicant: International Plant Propagation Technology Limited, Skipton (GB)

(72) Inventor: John Cooley, Skipton (GB)

(73) Assignee: INTERNATIONAL PLANT PROPAGATION TECHNOLOGY LTD, Yorkshire (GB)

(*) Notice: Subject to any disclaimer, the term of this patent is extended or adjusted under 35 U.S.C. 154(b) by 295 days.

(21) Appl. No.: 17/256,367

(22) PCT Filed: Jul. 5, 2019

(86) PCT No.: PCT/GB2019/051919
§ 371 (c)(1),
(2) Date: Dec. 28, 2020

(87) PCT Pub. No.: WO2020/012166
PCT Pub. Date: Jan. 16, 2020

(65) Prior Publication Data
US 2021/0267134 A1     Sep. 2, 2021

(30) Foreign Application Priority Data

Jul. 10, 2018  (GB) ...................................... 1811308
May 7, 2019  (GB) ...................................... 1906426

(51) Int. Cl.
*A01G 9/02*     (2018.01)
*A01G 9/029*    (2018.01)

(52) U.S. Cl.
CPC ........... *A01G 9/028* (2013.01); *A01G 9/0293* (2018.02)

(58) Field of Classification Search
CPC ...... A01G 9/028; A01G 9/0293; A01G 9/029; A01G 9/027; A01G 9/0295; A01G 9/045; A01G 9/0297
See application file for complete search history.

(56) References Cited

U.S. PATENT DOCUMENTS 6,199,334 B1* 3/2001 Malloy .................. E04F 13/04
                                                    428/116
6,266,921 B1* 7/2001 Keskilohko .......... A01G 9/0295
                                                    47/87
(Continued)

FOREIGN PATENT DOCUMENTS

CN        207767002 U       8/2018
DE        202017003328      8/2017
(Continued)

OTHER PUBLICATIONS

126N58N: 126 Cell Stacking Eucalyptus & Forestry Propagation Tray for 35mm Ellepot by Proptek, https:/1) https://www.proptek.com/product/126n58n/, downloaded Jun. 28, 202.
(Continued)

*Primary Examiner* — Kristen C Hayes
(74) *Attorney, Agent, or Firm* — Thomas | Horstemeyer, LLP

(57) ABSTRACT

A plant-growing tray for containing cylindrical stabilised media for growing plants comprises an array of flared columns, a lower end of the columns being wider than an upper end. The columns define an array of cells therebetween for containing cylindrical stabilised media, and a column comprises one or more contact edges defined by an intersection between a wall of the flared column and a virtual cylindrical surface in a cell, such that the contact edges are suitable for contacting a cylindrical stabilised medium positioned in the cell.

16 Claims, 16 Drawing Sheets

(56) References Cited

U.S. PATENT DOCUMENTS

| | | | |
|---|---|---|---|
| 9,706,718 B1 | | 7/2017 | McMillan |
| D930,500 S | * | 9/2021 | Cooley ........................ D11/155 |
| 2011/0232183 A1 | | 9/2011 | Chang |
| 2014/0165467 A1 | | 6/2014 | DeYoung |
| 2018/0255712 A1 | | 9/2018 | Smal |

FOREIGN PATENT DOCUMENTS

| | | |
|---|---|---|
| GB | 2566797 A | 3/2019 |
| GB | 2570346 A | 7/2019 |
| GB | 2591170 A | 7/2021 |
| KR | 20110009018 A | 1/2011 |
| WO | 2018229486 A1 | 12/2018 |

OTHER PUBLICATIONS

126S58I: 126 Cell Stacking Eucalyptus & Forestry Propagation Tray for 35mm Ellepot, https://www.proptek.com/product/126s58i/, downloaded Jun. 28, 202.

Examination Search Report in co-pending related GB Application No. GB1906426.0, dated Mar. 10, 2022.

PCT Search Report in co-pending related PCT Application No. PCT/GB2019/051919, dated Sep. 19, 2019.

Search Report in co-pending, related GB Application No. 1811308.4, dated Sep. 6, 2019.

Search Report in co-pending, related GB Application No. 1906426.0, dated Oct. 28, 2019.

\* cited by examiner

Section A - A

PLANT-GROWING TRAY

CROSS REFERENCE TO RELATED APPLICATIONS

This application is the 35 U.S.C. § 371 national stage application of PCT Application No. PCT/GB2019/051919, filed Jul. 5, 2019, which application claims the benefit of Great Britain Application No. GB 1811308.4, filed Jul. 10, 2018 and Great Britain Application No. GB 1906426.0, filed May 7, 2019, all of which are hereby incorporated by reference herein in their entireties, including any figures, tables, nucleic acid sequence, amino acid sequences, or drawings.

The invention relates to a plant-growing tray for containing stabilised media for growing plants, and in particular to a plant-growing tray for containing cylindrical stabilised media.

BACKGROUND

In commercial plant-propagation systems, plants may be grown, or propagated, with their roots in any of a number of conventional growing media, such as soil, peat or coir. For convenience in this document growing media of all kinds will be referred to by the generic term "compost".

When large numbers of plants are to be propagated, they may be arranged in trays, each tray being capable of holding a plurality of plants, such as typically between 6 and 800 plants. In some cases, the trays are handled by hand and in some cases they are handled by automated machinery. In use, the trays are typically arranged on the ground or on benching or tables.

Plant trays of this type are sometimes termed plant frames, holders or carriers. The word tray will be used to include all of these terms in this document.

A tray typically comprises an array of cup-shaped cells, each cell being capable of containing compost for propagation of a plant. Traditionally, cells are filled with loose compost and plant seeds or cuttings. During growth, the plants in the cell develop a system of roots which holds together the compost in a "rootball" or "plug". Well-developed rootballs can be removed from cells all together as a single unit of compost and plant roots, but this only works when enough roots have developed to hold the compost together.

It is desirable to be able to remove rootballs from cells before the roots have fully developed, and also to remove the contents of cells that have not successfully grown a plant. However, this is not possible with loose-filled compost, which is a problem in the industry. A particularly popular way of overcoming this problem is to use stabilised media. Stabilised media for plant propagation typically comprise compost contained within some form of material which holds the compost together while the roots of the plant develop, or compost mixed with a binder which holds the compost together. A variety of types of stabilised media are available, including polymer glues which hold the compost together, and Jiffy® plugs which contain the root ball in a mesh material.

A particularly popular form of stabilised media is cylindrical, or tubular, stabilised media, such as an Ellepot®, in which a volume of compost is held in a (typically cylindrical) membrane of a permeable material, such as paper. The membrane is designed to retain the compost until the plant's root structure is sufficiently developed to retain the compost itself. Cylindrical stabilised media such as Ellepots® may be made on site as a continuous extruded tube of soil, which is wrapped in a membrane and cut into individual cylindrical "plugs" of an appropriate length. Cylindrical stabilised media are therefore naturally parallel sided. Each cylindrical plug may be placed upright in the cell of a plant tray ready for plant propagation.

In order to propagate plants in which the development of a good root system is important, it is desirable to be able to propagate plants from cylindrical stabilised media in trays which allow "air pruning" of the developing plant roots. Air pruning occurs by providing apertures or openings in the walls of plant containers, through which roots protrude but are stunted in growth (i.e. pruned) by air. Secondary roots then develop and these in turn are 'air pruned'. This produces a root system with a large number of young vigorous roots which are well distributed vertically and also contain fewer defective roots. Air pruning thus reduces root circling and promotes a healthy root system. Prior art trays have therefore developed towards more "skeletal" designs using as little plastic as possible to reduce tray weight and maximise air flow.

Most trays currently used to hold stabilised media are thermoformed plastic trays, which are naturally tapered, so that they are wider at the top than the bottom.

While the bottoms of the tapered cells may hold the bases of the stabilised media in position, these tapered cells have the problem that stabilised media, in particular cylindrical stabilised media, inserted into the cells are prone to tip over rather than standing upright in a repeatable, central position in the cell. This is problematic for a number of automated processes involved in plant propagation, as the stabilised media are not positioned uniformly within the cells of the tray. This is also undesirable for the growth of the plant in the stabilised medium, as the plant may grow out of the stabilised medium at an angle, and the airflow round the stabilised medium may be uneven.

In order to allow propagation of plants in cylindrical stabilised media, some prior art trays such as the 126N58N tray by Proptek® have used plastic fingers which project upwards in between cells. Stabilised media can be held and supported upright by several fingers arranged around the cell, while lots of air may flow past the fingers to air prune the stabilised media.

Another tray for stabilised media, the 126S58I tray by Proptek®, has four pairs of vertical ribs arranged around each square cell. The inner ends of the ribs contact the cylindrical stabilised medium and support it in an upright central position, while allowing airflow past the sides of the cylindrical stabilised medium to promote air pruning. Apart from four vertical walls connecting each pair of ribs to one another, and a grid-like tray base, the structure of the 126S58I tray is open, to lighten the tray and allow maximum air-flow through the tray and around the stabilised media.

While both of these prior art trays are desirably light, and provide good air-pruned plants, the inventors have now appreciated that in trays with a high cell (and therefore plant) density, "bridging" of roots may occur between neighbouring plants. Root "bridging" is when roots from one cell grow across into the root system of a plant in another cell, causing uneven plant growth and making it difficult to remove and separate plants. Problems with irrigation management may also occur, as stabilised media in prior art trays may dry out too quickly, particularly in windy conditions and in hot weather.

SUMMARY OF INVENTION

The invention provides a plant-growing tray as defined in the appended independent claim, to which reference should now be made. Preferred or advantageous features of the invention are set out in dependent sub-claims.

A plant-growing tray for containing stabilised media for growing plants may comprise an array of flared, or tapered, columns which are wider at their lower end than at their upper end. An array of cells is defined between the columns such that inclined column walls form inclined cell side walls. The cell side walls may comprise one or more contact portions, or support portions, which lie on a virtual cylindrical surface in a cell such that the contact portions are suitable for contacting a cylindrical stabilised medium positioned in the cell.

The contact portions may be configured to contact and support a stabilised medium, and are preferably configured to support an upper portion of the stabilised medium positioned in the cell. The contact portions may be configured to contact a stabilised medium along a line of contact (for example, the contact portions may comprise ribs or edges), or the contact portions may be configured to contact a stabilised medium at a point of contact (for example, the contact portions may comprise projections).

The columns are preferably hollow, and are particularly preferably open at both ends to define "chimneys", or passages, through which air may flow through the tray.

Many plant-trays in the prior art, in particular re-usable injection-moulded plastic plant trays designed to be "stacked" one on top of another, are formed with vertical cell walls for strength and rigidity. Strength is highly important for trays which may be loaded with a large weight of compost, plants and water in use, and vertical walls have been thought to be necessary to support the weight of the loaded tray. Vertical cell walls are also typically chosen to maximise the plant density achievable within a tray of predetermined dimensions. The necessity of a draft angle for injection moulding, however, means that moulding "vertical", or upright, walls, necessarily results in walls which are thicker at their base than at their top (or vice versa). This means upright walls must be further thickened in order to achieve sufficient strength, with the additional plastic adding weight and cost to the tray. By providing trays with inclined walls, however, the inventor of the present application has found that walls may be more reliably moulded with uniform thickness. As inclined, or non-vertical, walls may be moulded between male and female moulds approaching from above and below, the inclined walls may be formed with completely parallel faces, and uniform thickness throughout the wall. This may advantageously allow cell walls to be made thinner and lighter, as well as cheaper and easier to manufacture reliably.

In a first aspect, there is provided a plant-growing tray for containing cylindrical stabilised media for growing plants. The tray may comprise an array of flared columns, which define an array of cells therebetween for containing cylindrical stabilised media. The flared columns are arranged so that a lower end of the flared columns is wider than an upper end. A flared column comprises one or more contact edges, the contact edges being defined by an intersection between a wall of the flared column and a virtual cylindrical surface in a cell, such that the contact edges are suitable for contacting a cylindrical stabilised medium positioned in the cell.

The flared columns each comprise one or more inclined, or non-vertical, walls. The angle of inclination, or draft angle, of the column walls may vary depending on the intended use of the plant-growing tray and the desired aspect ratio of the cells. In a preferred embodiment suitable for early stage forestry propagation, the draft angle of the inclined column walls is preferably greater than or equal to 1 degree, or 1.25 degrees, or 1.5 degrees, or 2 degrees, or 3 degrees, or 4 degrees from vertical, and less than or equal to 5 degrees, or 6 degrees, or 8 degrees or 10 degrees from vertical.

The inclined column walls mean that the distance between adjacent columns increases towards the tops of the columns, so that the cells are wider at their upper ends than their lower ends.

The flared columns may be hollow. The flared columns are preferably open at their lower-ends.

Preferably the flared columns are hollow and open-ended at both upper and lower ends, so that the columns form "chimneys" defining passages through which air may flow. All of the flared columns may be chimneys defining passages through which air may flow, or only some of the flared columns may be chimneys.

The flared columns may have various shapes. For example, the flared columns may be conical, or frusto-conical, or pyramidal, or frusto-pyramidal. The inclined walls of the flared columns may have a constant draft angle, or a draft angle which varies over its height. The columns may have a variety of cross sections. For example, the columns may comprise a circular cross-section, or a square cross section, or a polygonal cross section.

The flared columns are configured so as to define an array of cells between them. Preferably, a plurality of columns are arranged symmetrically around each cell. For example, the columns may be arranged in a square array, so that an offset square array of cells is defined between the columns. The columns may be configured to sit on the shared corners of four adjacent cells, so that a quarter of the column effectively faces into each cell. Alternatively, the columns may be configured to sit on the shared edge between two adjacent cells, so that half of the column effectively faces into each cell.

Preferably a cell may be defined as the space between four columns.

Each column may comprise one or more contact edges defined by an intersection between a wall of the flared column and a virtual cylindrical surface in a cell. Alternatively only some of the columns in the array may comprise contact edges.

Preferably each cell is surrounded by at least two, or at least three, or at least four flared columns.

Preferably each cell comprises at least two, or at least three, or at least four contact edges defined by the intersections between the columns surrounding the cell, and the virtual cylindrical surface in the cell. Thus in use, a cylindrical stabilised medium in the cell may contact at least two, or at least three, or at least four contact edges around the cell. This may advantageously support the stabilised medium upright in a central position in the cell. Particularly preferably, the contact edges are arranged symmetrically around the cell to provide even support to a stabilised medium.

Several cells may be arranged around a single flared column. For example, a square array of flared columns may define a square array of cells, with four cells surrounding each column, and vice versa.

Preferably a column comprises at least one contact edge configured to face each cell adjacent to the column. Where a flared column is surrounded by four cells, the flared column may preferably comprise four contact edges, each contact edge being configured to face a different cell.

The virtual cylindrical surface may be defined by its geometric definition as a surface bounded by two parallel planes and generated by a straight line moving parallel to the given planes and tracing a curve bounded by the planes and lying in a plane perpendicular to the given planes. Thus, the cylindrical surface may comprise a variety of cross sections, for example, a circular or square cross section.

Preferably the cylindrical surface is that of a circular cylinder, such that it may be occupied by a circular cylindrical stabilised medium such as an Ellepot®.

By providing a contact edge defining an intersection with a virtual cylindrical surface in a cell, the contact edge may contact and support a stabilised medium standing upright within the cell. Preferably the contact edge is configured to contact an upper portion of the stabilised medium, in use, in order to support the stabilised medium in an upright position.

The provision of a contact edge lying on a cylindrical surface may support a stabilised medium in an upright position, even though the walls of the flared columns are inclined so that the cells are wider at their upper ends. This may advantageously hold the stabilised media in a predetermined position for automated processes.

The contact edge may be formed, for example, by an end of a column wall, or by a vertex of the column walls, or by a change in the angle, or plane, of a column wall.

By forming an array of cells between flared columns, air flow to the sides of stabilised media positioned in the cells may be advantageously restricted. Contrary to the desire in the prior art to minimise plastic and maximise the surface area of the stabilised media exposed to air for air pruning, the inventor of the present application has found that it may be advantageous to reduce air flow compared to the skeletal tray designs of the prior art. While air pruning remains desirable, the inventor has appreciated that the skeletal trays of the prior art provide air flow to the detriment of irrigation management.

When plants are grown in stabilised media, it is important to control the retention time of water in the stabilised media. The media must not become waterlogged, but the inventor has realised that excessive air flow past the stabilised media may cause media to dry out undesirably quickly. This is particularly problematic in hot weather. To solve this problem, the inventor has ignored the aim of the prior art to remove plastic and maximise air access, and has found that providing flared columns between cells restricts air flow by increasing the area of plastic around the stabilised media.

The use of flared columns between adjacent cells also reduces the risk of root "bridging" between stabilised media in nearby cells. Where in the densely-packed trays of the prior art, the open structure may allow some roots to grow across the void between cells and to attach to another plant, the flared columns provide an obstacle which separates stabilised media and reduces this problem.

The flared columns used in the plant growing-tray of the present invention may also be much more robust than the upright "fingers", or "ribs", used in the 126N58N prior art tray, which may advantageously increase the usable life of the tray.

Although the use of flared columns may advantageously increase the area of plastic separating neighbouring cells, in order to reduce air flow and root bridging, by moulding the columns with inclined walls, the problems described above with injection moulding vertical walls may be avoided, and the weight of the tray may be kept low.

A wall of the flared column which defines a cell wall may comprise two contact edges, one of which is defined on either side of the intersection between the wall of the flared column and a virtual cylindrical surface in a cell.

The two-contact edges may be connected at their upper ends to form an arch-shaped contact edge defined by the intersection between the wall of the flared column and a virtual cylindrical surface in a cell. Thus, when a cylindrical stabilised medium is positioned in the cell, the arch-shaped contact edge may form a line of contact with the surface of the stabilised medium.

The flared column may comprise an arcuate, or arch-shaped, contact edge defined by the intersection between the wall of the flared column and a virtual cylindrical surface in a cell. The contact edge may extend from the base of the flared column, up the wall of the flared column to an apex, and back to its base, so that it forms a continuous contact edge across a portion of the virtual cylindrical surface.

The contact edge may be formed by an edge of an opening through the wall of the flared chimney. Thus, when a cylindrical stabilised medium is inserted into the cell, the stabilised medium contacts the arch-shaped edge of the opening.

The "arch-shaped" contact edge may comprise, for example, a parabolic arch, or a round arch, or a triangular arch, and may have a rounded apex or a pointed apex.

The one or more contact edges may be formed either side of a vertex of the flared column.

The columns may be configured so that one or more vertices of the column walls intersect with or contact the virtual cylindrical surface in the cell. Thus, when a cylindrical stabilised medium is inserted into the cell the vertices may contact the stabilised medium along a line of contact.

The columns may be configured so that one or more walls, or faces, of the column intersect with the virtual cylindrical surface in the cell. Thus, when a cylindrical stabilised medium is inserted into the cell the column walls may contact the stabilised medium along a line of contact along the one or more contact edges.

The distance between contact edges may be spanned by a concave portion of the column. The concave portion may thus be positioned between two contact edges, or below an arch-shaped contact edge, defining lines of intersection of the column with the same virtual cylindrical surface.

The columns may be configured so that the concave portion lies on the virtual cylindrical surface in the cell. The concave portion may be formed as a curved surface curving inwards into the column wall, and outwards relative to the virtual cylindrical surface. By providing a concave portion in the column, the column walls may advantageously be shaped to accommodate the cylindrical surface in the cell.

The concave portion may have a curvature equal to that of the virtual cylindrical surface. The concave portion may define a portion of the virtual cylindrical surface in the cell. Thus, the concave portion may be configured to contact a cylindrical stabilised medium in the cell over its entire surface, as well as along the contact edge.

The concave portion may have a curvature greater than that of the virtual cylindrical surface. Thus, a cylindrical stabilised medium in the cell may contact the column wall along the contact edges, but not contact the surface of the concave portion.

As the flared columns have sloping walls, the cell diameter is reduced towards the bottom of the cells. The width and depth of the concave portion in the column wall may advantageously vary according to its position along the height of the column in order to accommodate the cylindrical surface and the changing separation of the sloped column walls.

A concave portion in the column may advantageously provide a contact surface configured to contact a section of a stabilised medium positioned in a cell.

The concave portion may be configured to lie on the cylindrical surface (and thus to contact a cylindrical stabilised medium, in use) over an angular distance of greater than or equal to 2 degrees, or 5 degrees, or 10 degrees, or 15 degrees, or 20 degrees, or 25 degrees around the circumference of the cylinder, and less than or equal to 30 degrees, or 35 degrees, or 40 degrees, or 45 degrees, or 50 degrees. This may advantageously provide a wide enough contact surface between the column and the stabilised medium that the stabilised medium is held firmly in position.

In prior art trays, the surface area of the tray in contact with stabilised media has intentionally been minimised in order to allow lots of air flow around the walls of the stabilised media. Providing contact surfaces which obstruct air flow has been intentionally avoided in the prior art as it was thought to be an undesirable feature.

The concave portion may extend upwardly over the flared column. The concave portion may widen towards a base of the column.

As the inclined column walls of adjacent columns converge and narrow the cell towards its base, the concave portion in the column wall may widen, and may deepen, so that the concave portion still lies on the cylindrical surface. This may advantageously allow a cylindrical stabilised medium to fit into the base of the cell, despite the narrowing column walls.

The concave portion may extend upwardly over at least 40%, or 50%, or 60%, or 70%, or 80%, or 90% of the height of the flared column. Preferably the concave portion may extend over the entire height of the flared column.

In order to support the stabilised medium in the cell, the concave portion may advantageously be configured to lie on the virtual cylindrical surface in the cell over at least 40%, or 50%, or 60%, or 70%, or 80%, or 90% of the height of the flared column. The concave portion may be configured to lie on the cylindrical surface over the entire height of the flared column.

The columns, which are preferably hollow, may comprise one or more openings, or apertures, through a wall of the flared column, the edges of the openings being configured to lie on the cylindrical surface in the cell. The openings may provide an aperture between the cell and the interior of the hollow column, which is preferably open at at least its lower end.

Providing one or more openings through a wall of the flared column may advantageously allow some air pruning and drainage of excess water to occur, while the column walls restrict excessive air flow and root bridging. By arranging the edges of the openings to lie on the cylindrical surface in the cell, the edges of the openings may further act as contact edges, or contact portions, to contact and support the stabilised medium over lines of contact around the openings.

The column preferably comprises one or more arch-shaped openings through a wall of the flared column. The arch-shaped openings preferably widen towards the base of the column.

The openings may preferably be shaped as arches in order to conform to the intersection of the cylindrical surface and the inclined column walls. Preferably, a lower end of the arch-shaped opening is positioned at the base of cell, or the base of the column, such that, in use, the widest portion of the arch is positioned at the cell base, where the separation between column walls is at its minimum. The openings may be configured so that the cylindrical surface effectively extends through the openings to the other side of the column walls. Thus a cylindrical stabilised medium positioned in the cell may partially protrude through the openings in the column walls. This arrangement may advantageously combine the benefits of holding the stabilised medium securely in position, air pruning, and preventing excessive air flow and root bridging. By proving openings with their lower ends at the cell base, the column walls can taper towards one another without impinging on the cylindrical surface. This may advantageously allow the density of cells in the tray to be increased, or the draft angle of the column walls to be increased for easier manufacture.

The edge of an opening may advantageously form a single, continuous, contact edge configured to contact a cylindrical stabilised medium in the cell. Where the opening is arch-shaped, the perimeter of the opening may form an arcuate contact edge along the intersection of the flared column wall and the virtual cylindrical surface. Thus, when a cylindrical stabilised medium is inserted into the cell, the stabilised medium may contact the edge of the arch-shaped opening continuously along its length.

The openings may be positioned between two contact edges on the same column wall. Preferably the opening spans the distance between two contact edges.

In a preferred embodiment, the one or more openings are positioned within, or below, the one or more arch-shaped contact edges in the flared column.

The one or more openings are preferably positioned within one or more concave portions in the flared column. This may allow the openings and the concave portions to contact and support the stabilised media along the same line of contact for improved stability, and may combine the advantages of both the openings and the concave contact portions.

The openings may be configured to lie on the virtual cylindrical surface over an angular distance of greater than or equal to 2 degrees, or 5 degrees, or 10 degrees, or 15 degrees, or 20 degrees, or 25 degrees around the circumference of the cylinder, and less than or equal to 30 degrees, or 35 degrees, or 40 degrees, or 45 degrees. This may advantageously provide a wide enough opening to allow air pruning of the stabilised medium through the opening, and for the edges of the opening to contact and grip the stabilised medium.

The one or more openings may be formed through a vertex of the flared column.

Two contact edges may be positioned on column walls either side of a vertex of the same flared column, and the portion of the vertex between the contact edges may be configured to define an intersection between the walls of the flared column and a virtual cylindrical surface in a cell. A portion of the vertex may be configured to form a concave portion, or an opening, in order to accommodate the intersection with the virtual cylindrical surface.

For example, a square-based frusto-pyramidal column may be positioned at the shared corner of four cells in a square array, so that a corner (vertex) of the column protrudes into each cell. An opening may be formed in the column by removing an arch-shaped section from the vertex, such that the edges of the opening lie on the cylindrical surface and can contact and support a stabilised medium in the cell.

A wall of the flared column may define a cell side wall and comprise an opening below the contact edge. The area of the opening preferably occupies less than 60% of the area of the cell side wall, or less than 50%, or 40%, or 30%, or 20%, or 10% of the area of the cell side wall, preferably at least 8%, or 6% or 4% of the area of the cell side wall.

This may advantageously mean that a sufficient portion of the surface area of the stabilised media is exposed to air flow through the openings for air pruning to occur, while also restricting air flow to a level that does not dry out the stabilised media too quickly after watering.

Some prior art trays, such as Proptek's 126N58N tray, have skeletal structures in order to increase airflow and lighten the trays, in which around 80% of the surface area of the cell side wall is open.

The openings in the flared columns may extend upwardly from a cell base over a portion of the column that is greater than or equal to 25%, or 30%, or 40% of the height of the flared columns, and less than or equal to 45%, or 50%, or 60%, of the height of the flared columns.

The flared columns may comprise a plurality of convex walls configured to form cell walls. For example, the convex column walls may bulge into the cells, so that the cell is at its narrowest in line with the centre of the column walls.

The flared columns may comprise a plurality of flat walls configured to form cell walls. The flat column walls may be configured to span "corner" portions of the cell at an angle relative to the regular array of cells, or the column walls may be arranged parallel or perpendicular to the regular array of cells.

Preferably one or more of the flared columns is hollow and defines an open-ended passage through which air may flow, in use. The columns may thus act as vents via which air may flow upwards or downwards through the tray, without flowing past the sides of the stabilised media and causing problems with irrigation management.

An upper portion of the flared columns may be chamfered, such that the chamfered columns define a widened upper portion of the cells.

The chamfered upper portion of the columns may be an upper portion with a draft angle greater than that of the rest of the column. For example, the chamfered upper portion may have a draft angle of greater than or equal to 15 degrees, or 20 degrees, or 25 degrees from vertical and less than or equal to 30 degrees or 35 degrees. The chamfered upper portion may have a draft angle of greater than or equal to 35 degrees, or 40 degrees, and less than or equal to 45 degrees or 50 degrees from vertical.

The chamfered upper portion of the columns may advantageously be rounded.

The chamfered upper portions may advantageously provide "guide-in" surfaces to assist placement of stabilised media in the cells, particularly by automated machinery.

In a particularly preferred embodiment, the chamfered upper portion of the columns may be rounded in both horizontal and vertical planes. This may advantageously provide a "soft-edged" guide-in portion for insertion and withdrawal of stabilised media to and from the cell. This may advantageously reduce the likelihood of stabilised media catching, or tearing, on the tray as they are inserted or withdrawn, which may be particularly useful for automated systems.

The chamfered upper portions of the flared columns may extend over greater than or equal to 5%, or 10%, or 15%, and less than or equal to 18%, or 20%, or 25%, of the height of the flared columns.

The plant-growing tray may comprise a plurality of column-connecting walls, or cell side-walls, configured to connect adjacent flared columns to one another. Column-connecting walls may advantageously improve the strength and rigidity of the tray.

In one preferred embodiment, the tray comprises column-connecting walls extending up and connecting columns along their entire height. This may advantageously prevent root bridging and air flow between adjacent cells, in order to assist irrigation management.

Alternatively, the column-connecting walls may connect adjacent columns along only a portion of their height. For example, the column-connecting walls may take the form of a rib or bar extending between the chamfered upper portions of adjacent columns, but leaving an opening underneath to allow some air flow between cells.

The column-connecting walls may be configured to connect the upper ends of adjacent columns to one another, such that the column-connecting walls form a tray top on top of which a similar tray may be stacked. The tray may thus be a stacking tray.

In a preferred embodiment, the column-connecting walls may extend upwards from the base of the columns over only a portion of their height, and the lower ends of the flared columns may be hollow. As the columns have inclined walls, narrowing towards the top, such a tray may be configurable in a nesting configuration with a similar tray, wherein the flared column of a lower tray may nest underneath, and inside, the flared column of an upper tray. The tray may thus be a nesting tray, which may be advantageously space efficient for storage and transport.

In order to form a nesting tray, preferably the column-connecting walls are configured to connect the lower ends of adjacent columns to one another and to extend upwardly from the lower end over a portion of the column that is greater than or equal to 10%, or 20%, or 30% of the height of the columns, and less than or equal to 40%, or 50%, or 60% of the height of the columns.

The plant-growing tray may comprise a cell base formed by a plurality of ribs extending between columns across a lower end of the cell. This may advantageously provide good drainage, and allow air flow for air pruning to the base of a stabilised medium positioned in the cell. These ribs support the bases of the stabilised media and reduce the chance of soil falling out of the stabilised media. The cell base may comprise a hole through which an ejector pin may extend to eject the plant from the tray.

In a preferred embodiment, the tray may comprise a plurality of projections configured to contact a cylindrical stabilised medium positioned in the cell. Preferably the projections may be configured to contact an upper portion of a cylindrical medium positioned in the cell.

Such projections may advantageously help to support the stabilised media in an upright position. This may be particularly useful where the one or more contact edges are provided in a lower portion of the cell.

In certain plant propagation applications, for example in the propagation of seedlings for forestry, cylindrical stabilised media can be relatively long and thin. These slim stabilised media may be more prone to overbalancing and tipping out of a vertical position when positioned in the plant tray. The use of contact edges along the intersection of the flared walls and the cylindrical surface of the cylindrical stabilised media helps to support the stabilised media in place, but the natural expansion and contraction of stabilised media throughout watering cycles means that at some times the stabilised media may lose contact with the contact edges, allowing movement within the cell. Particularly where the contact edges are provided relatively low down the height of the stabilised medium, this may allow the top of the stabilised medium to move out of its central upright position.

Providing projections configured to contact the cylindrical stabilised media in addition to the contact edges may advantageously help to support the stabilised media in position in the cell. The projections may preferably be provided only in an upper portion of the cell, in order to contact an upper portion of the cylindrical stabilised medium and support it in place, without adding the weight of a full-height plastic moulding.

Preferably the one or more projections are positioned higher up the cell than, or extend to a greater height than, the one or more contact edges. The projections may then add support higher up the stabilised media to reduce the possibility of tipping out of an upright position in the centre of the cell.

The one or more projections may be configured so that a portion of the projections lies on the same virtual cylindrical surface as the contact edges. Alternatively, the one or more projections may be configured to project to a point inside or outside the virtual cylindrical surface. For example, a portion of the projections may lie on a second virtual cylindrical surface with a diameter smaller than or larger than that of the virtual cylindrical surface on which the contact edges lie. This may advantageously allow the projections to contact and hold a stabilised medium more or less tightly as desired.

As cylindrical stabilised media comprise soil held in a flexible retaining material, the dimensions of the stabilise media may vary due to natural expansion and contraction of the soil during watering cycles. By providing contact edges and projections which may define cylindrical surfaces with different radii, the cells may offer improved support to the stabilised media throughout the watering cycle.

Preferably each cell may comprise two, or three, or four, or six, or eight, projections arranged around the cell and projecting into the cell to contact the stabilised medium. Preferably the projections are arranged symmetrically around the perimeter of the cell.

The projections may project into the cell from one or more of the flared columns, or from column-connecting walls.

The projections preferably have a sloped or curved upper surface. The projections may be rounded, or radiused. This may advantageously help to guide stabilised media into the cell, in the same way as the "chamfered upper portion" described above. For example, the upper surface of the projections may have a draft angle of greater than or equal to 15 degrees, or 20 degrees, or 25 degrees from vertical, and preferably less than or equal to 30 degrees or 35 degrees. The upper surface of the projections may have a draft angle of greater than or equal to 35 degrees, or 40 degrees, and less than or equal to 45 degrees or 50 degrees from vertical.

In a preferred embodiment, the top surface of the projections are positioned level with the lower end of the chamfered upper portion, and the top surface of the projections are angled at the same draft angle as the upper portion of the columns. This may help to guide stabilised media into the cell, and reduce the chance of stabilised media becoming snagged on the projections.

In a preferred embodiment, the one or more projections may comprise one or more vertical ribs. The vertical ribs may extend in a vertical direction over at least a portion of the height of the cell. The vertical ribs are preferably configured to project into the cell so that a vertical edge of each rib lies on the virtual cylindrical surface.

Vertical ribs may advantageously support the stabilised media in place while also performing a "root training" function, by preventing root circling and directing growing roots downwards towards the tray base.

In a particularly preferred embodiment, the contact edges may be formed by the edges of openings through the flared chimney walls, and each cell comprises a plurality of vertical ribs configured to contact a cylindrical stabilised medium positioned in the cell. Both the contact edges and the innermost edges of the vertical ribs lie on the virtual cylindrical surface in the cell, so that a stabilised medium in the cell may contact both the contact edges and the vertical ribs. This may advantageously provide improved support to keep the stabilised medium in an upright position during use.

In a preferred embodiment, the vertical ribs extend between the cell base and the chamfered upper portion of the columns.

The ribs may extend from the base upwardly over the whole height of the column.

In a preferred embodiment the vertical ribs extend upwardly from the lower end over a portion of the column that is greater than or equal to 60%, or 70%, and less than or equal to 80%, or 90% of the height of the columns.

The innermost ends of the projections, or vertical ribs, are preferably configured to lie on a virtual cylindrical surface in the cell, so that they contact a cylindrical stabilised medium in use. Preferably the innermost ends of the projections lie on the same virtual cylindrical surface as the contact edges. In a preferred embodiment, the innermost ends of the projections or ribs may be angled to lie on the same virtual cylindrical surface as the contact edges. That is, rather than having a "square" end contacting the stabilised medium, the innermost faces of the projections or ribs may be shaped or bevelled to follow the curved cylindrical surface. This may mean that each projection or rib presents a flat end "face" to the stabilised medium, rather than a sharp corner, even if the projections are not arranged radially around the cell. This may advantageously provide improved support to stabilised media.

In a preferred embodiment the projections project from the column walls into the cell. This may advantageously require less plastic, and therefore allow a lighter weight tray, than the vertical cells of prior art trays such as the 126S58I, where vertical ribs extend from the dividing wall between cells.

By providing projections on the columns rather than in the gaps between adjacent columns, the spaces in between adjacent columns are kept open. This may advantageously allow improved air flow to the stabilised medium, as well as allowing the "fingers" of grading machines to be inserted into the cell to easily remove the stabilised media.

DESCRIPTION OF SPECIFIC EMBODIMENTS AND BEST MODE OF THE INVENTION

Specific embodiments of the invention will be now be described by way of example, with reference to the accompanying drawings in which:

FIG. 3b is a plan view of the tray of FIG. 3a;

FIG. 4b is a cross-sectional view, taken along the line X-X, of the cell of FIG. 4a;

FIG. 5b is a perspective view, from almost vertically above the plant tray of FIG. 5a;

FIG. 6b is a cross-sectional view, taken along the line A-A, of the plant-growing-tray of FIG. 6a;

FIG. 7b is a plan view of the section of plant-growing-tray of FIG. 7a;

Figure 1A:
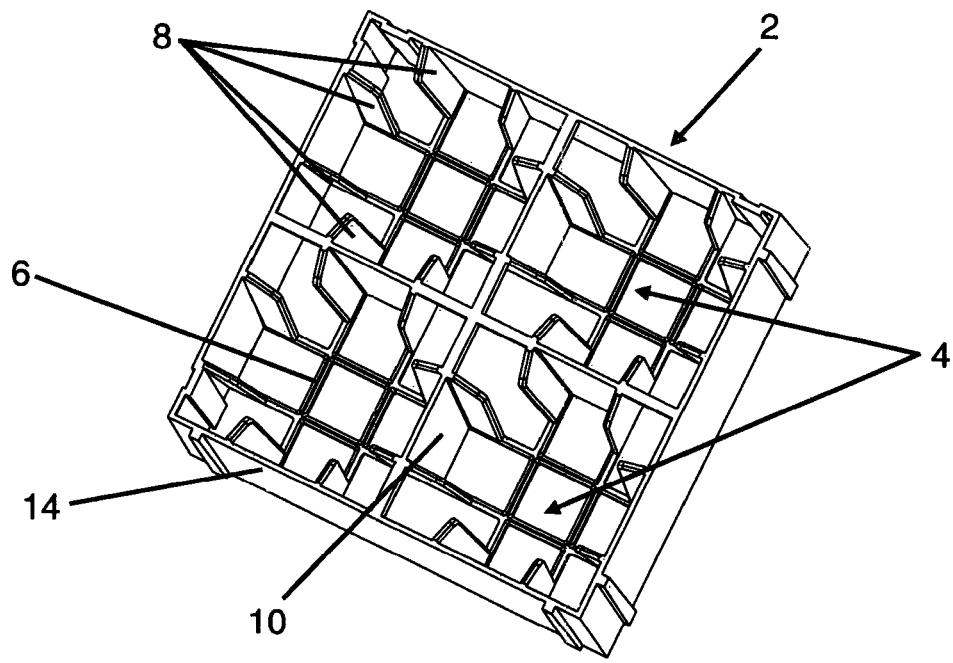
FIGS. 1a and 1b are perspective views, from above, of a section of a first plant tray according to the prior art.
Figure 1B:
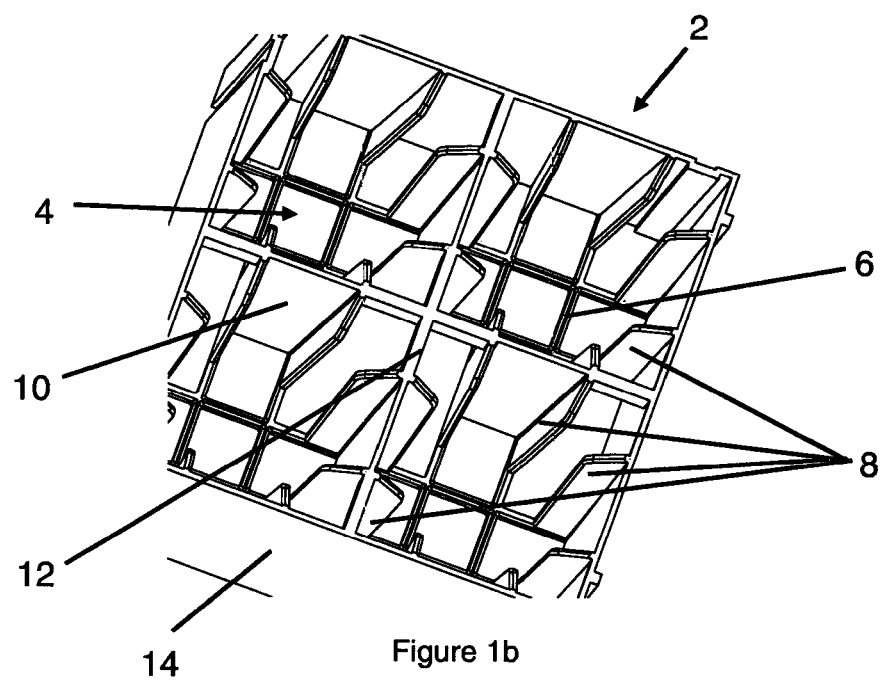

FIGS. 1a and 1b illustrate a repeat section of a prior art plant tray 2, which is marketed by Proptek® as model no. 126S58I: 126 Cell Stacking Eucalyptus & Forestry Propagation Tray. The illustrated section of prior art tray comprises a square, 2 by 2, array of square cells 4. Each cell is defined by a cell-base 6, formed by a grid of parallel base-ribs spanning a bottom end of the tray, and four pairs of support ribs 8 projecting into the cell. Individual pairs of ribs 8 are connected to one another by vertical cell side-walls 10. Tray-top ribs 12 connect separate cell side-walls to one another at the top of the tray. Between side walls 10 the corners of the cells are open, so that air may flow freely between the cells and around stabilised media positioned in the tray.

Support ribs 8 are arranged to extend vertically from the cell-base, so that when a cylindrical stabilised medium (not shown) is inserted into a cell, its bottom end rests on the cell-base 6, and the support ribs 8 contact the sides of the stabilised medium so as to hold it upright in the cell.

FIGS. 1a and 1b show a four-cell unit bounded by dividing wall 14, which extends vertically from the cell base to the tray top. The 126S58I commercial embodiment of the tray, however, comprises 126 cells in a 9×14 array, in which the boundary wall is formed only around the outermost edge of the 9×14 array.

Figure 2A:
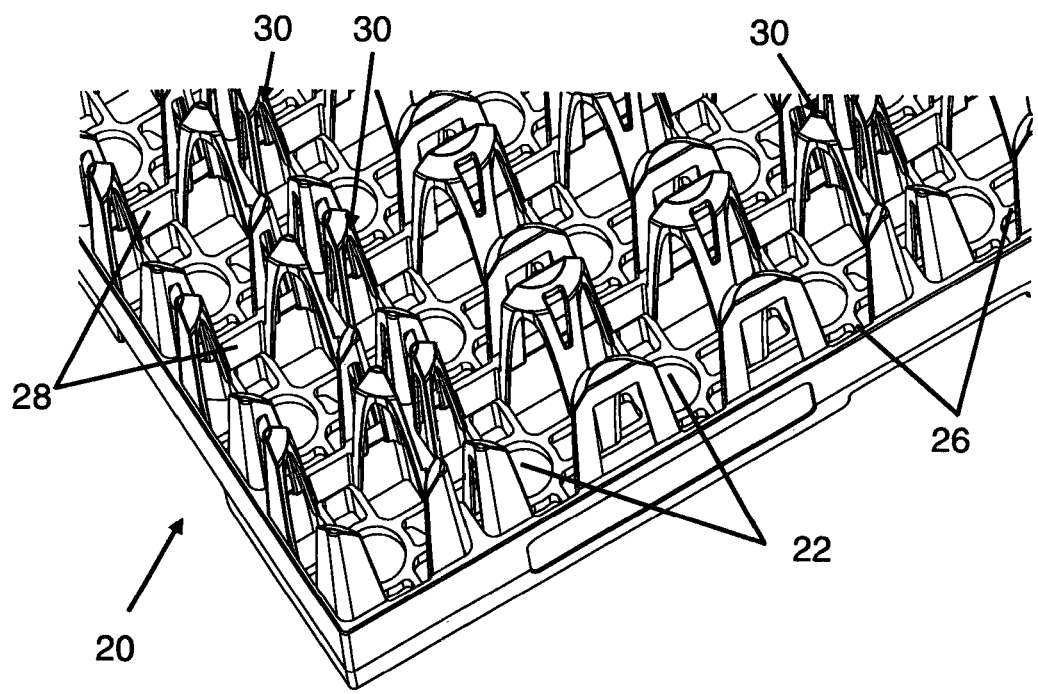
FIG. 2a is a perspective view of a second plant tray according to the prior art.
Figure 2B:
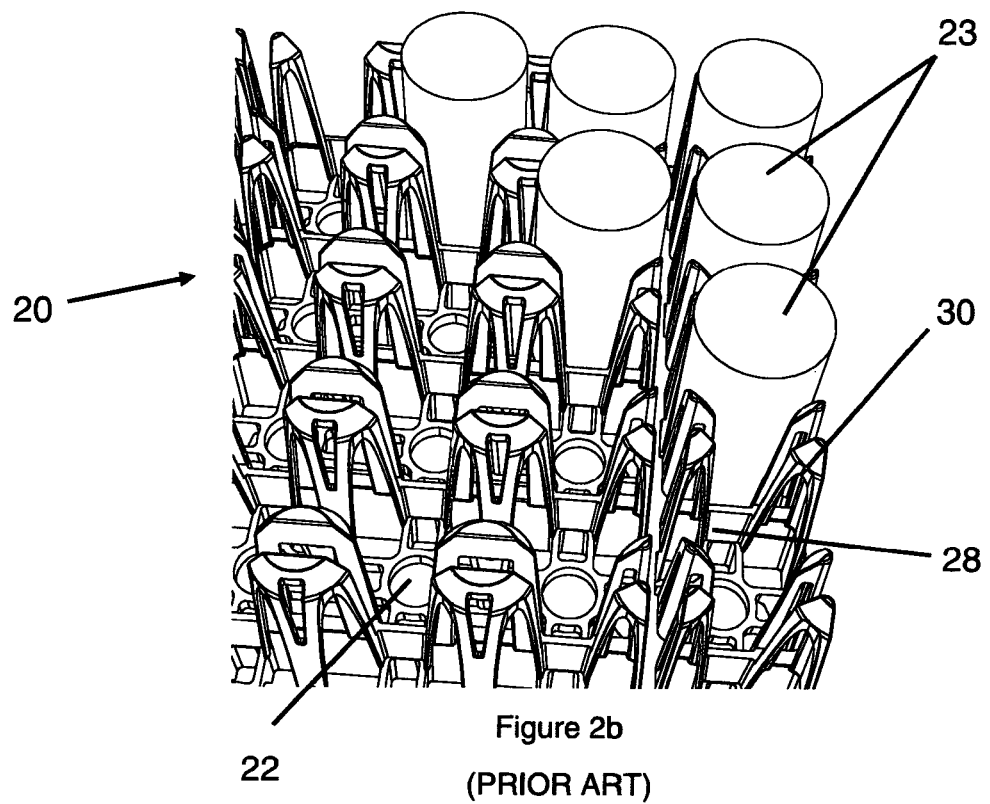
FIG. 2b is a perspective view of the prior art plant tray of FIG. 2a, containing several cylindrical stabilised media.

FIGS. 2a and 2b show a section of a different prior art plant tray 20, which is marketed by Proptek® as model no. 126N58N: 126 Cell Nesting Eucalyptus & Forestry Propagation Tray.

The 126N58N prior art tray 20 comprises a regular array of cells 22, each of which is defined by a cell-base 26 formed by a grid of base-ribs, and a cell wall 28 which projects upwards approximately 10 mm above the cell base 26 and extends around the sides of the square cells. Each cell 22 comprises four pairs of ribs which project upwards from the cell-base, and converge to connect to one another and form an inverted "V" shaped rib 30 over the corner of the cell. Some inverted V ribs 30 are connected to the inverted V rib of an adjacent cell by a connecting member at their uppermost end. Inverted V ribs 30 which are not connected to an adjacent rib 30 are supported by a third upright rib which extends upwards from the corner of the cell to form a tripod with the inverted V shaped rib 30.

Large openings under the upright ribs allow the tray 20 to be nested with a similar tray, the uprights of which can be nested underneath and inside the inverted V ribs of the tray above.

As shown in FIG. 2b, in use, stabilised media 23 such as Ellepots® are inserted into the cells 22 between the inverted V shaped ribs at the corners of the cells. When the stabilised media are in position within the cells, the inverted V ribs 30 abut the sides of the stabilised media to hold them in place. The inverted V ribs 30 and the cell base 26 are very thin, so that the area of plastic tray in contact with each stabilised medium is very small, and as much of the stabilised medium as possible is exposed to airflow for air pruning.

FIG. 3a to 3e illustrate a plant tray 40 according to a first preferred embodiment of the present invention.

The tray 40 is formed from hollow columns, or chimneys, 42 arranged in a regular square array, so that the spaces left between adjacent columns 42 form a regular array of cells 44. Each column 42 is shared between four cells, so that each quarter of the column effectively protrudes into the corner of a different cell.

The columns 42 are flared in shape, with their bases wider than their tops, and four inclined convex walls 46 arranged in a roughly diamond shape relative to the array of cells, so that each convex column wall 46 forms a cell wall of a different cell. The columns are hollow, and open-ended, so that air may flow upwards or downwards through the columns without passing through a cell.

Base ribs 48 extend between the bases of neighbouring column walls 46 in a grid that defines the cell-base.

An upper portion 52 of the column walls is chamfered to widen the cell opening through which stabilised media are inserted into and removed from the cell, in order to make placement of stabilised media easier, particularly for automated systems. The chamfered upper portion 52 is rounded in both horizontal and vertical planes, in order to provide a smooth surface for guiding-in stabilised media to the cells.

Column-connecting walls 50 span the gap between adjacent columns 42, and extend from the base to the upper end of the columns, so that the top surface of the column-connecting walls forms a tray top.

Cross-bars 56 are positioned inside the hollow columns 42 and span the open upper ends of the columns to provide improved strength and rigidity.

Pairs of two contact edges 57 are formed on each column wall by a change in angle of the column wall. The two contact edges 57 are arranged either side of, and define, the intersection between the inclined column wall and a virtual cylindrical surface in the cell.

The pairs of contact edges 57 are separated by an angular distance of 40 degrees of the circumference of the virtual cylindrical surface.

Concave portions 58 are formed in each of the convex column walls 46 between pairs of contact edges 57, so that the concave portions span the space between the contact edges and lie on the virtual cylindrical surface.

The contact edges 57 and the concave portions 58 extend over the column walls over the entire height of the columns, from the cell base to the upper end of the columns.

Below the chamfered upper portion 52 of the columns, the contact edges and concave portions of all four columns around a cell 44 lie on the same virtual cylindrical surface. Thus, when a cylindrical stabilised medium of appropriate dimensions is inserted into the cell, the outer walls of the stabilised medium will contact the concave portions of the columns.

As the column walls 46 are inclined, or tapered, the separation of opposing columns is smaller at the cell base than it is at the cell top. The concave portions 58 therefore become gradually wider and deeper towards the base of the column wall, so that the concave portion still lies on the cylindrical surface as the column separation narrows.

In the preferred embodiment shown in FIGS. 3a-3d, the lower, non-chamfered portion of the convex column walls 46 has a draft angle of 1.25 degrees from vertical. While a non-zero draft angle is required for injection moulding, the concave portions 58 have a draft angle of 0.25 degrees to lie as closely as possible on the virtual cylindrical surface in the cell. The draft angle of the chamfered upper portion 52 of the columns is 26 degrees.

Each column wall 46 comprises an opening 54 in the concave portion. The openings 54 take the form of arch-shaped cut-outs in the column walls 46, starting at the column base and extending upwards from the base over approximately 45% of the column height. The openings 54 are widest at the column base, where they span an angular distance of 26 degrees of the column circumference, and gradually narrow as they extend upwards. As they are formed in the concave portions 58, the edges of the openings 54 lie on the same cylindrical surface as the concave portions. The edges of the openings 54 thus form contact edges defining an intersection between the wall of the flared column and the virtual cylindrical surface in the cell.

The size and shape of the openings 54 are selected so that the area of the opening in the column wall 46 is equivalent to roughly 9% of the total area of one of the column walls facing into the cell (opening surface area 178 mm$^2$; total surface area of one of the column walls facing into the cell 2048 mm$^2$). This opening is therefore significantly smaller than the apertures provided in the skeletal prior art trays, in which 60-80% of the cell sides are open.

Suitable cylindrical stabilised media are chosen to have an outer diameter approximately equal to the diameter of the virtual cylindrical surface defined by the concave portions 58.

One such suitable stabilised medium may be Ellepots® with a diameter of 30 mm. However, the skilled person will appreciate that trays may be provided to accommodate stabilised media of various heights and diameters by altering the heights and separation of columns in the array. Cylindrical stabilised media are typically available from 23 mm wide and from 30 to 60 mm tall. The biggest cylindrical medium currently available is 120 mm wide by up to 12 inches tall. For forestry applications, stabilised media are typically at least 30 mm wide and from 70 mm to 100 mm high, while the largest currently available is 40 mm wide and from 80 to 120 mm tall.

Figure 3A:
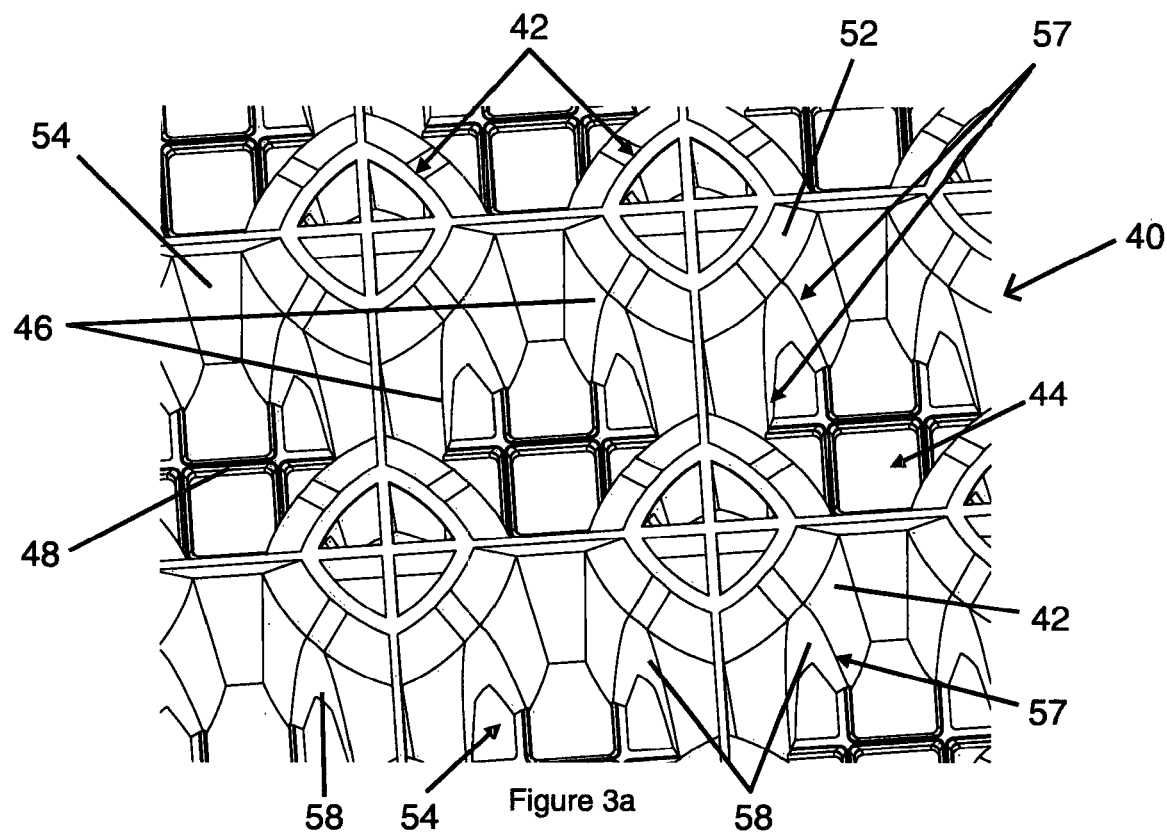
FIG. 3a is a perspective view, from above, of a section of a plant tray according to a first preferred embodiment of the present invention.
Figure 3B:
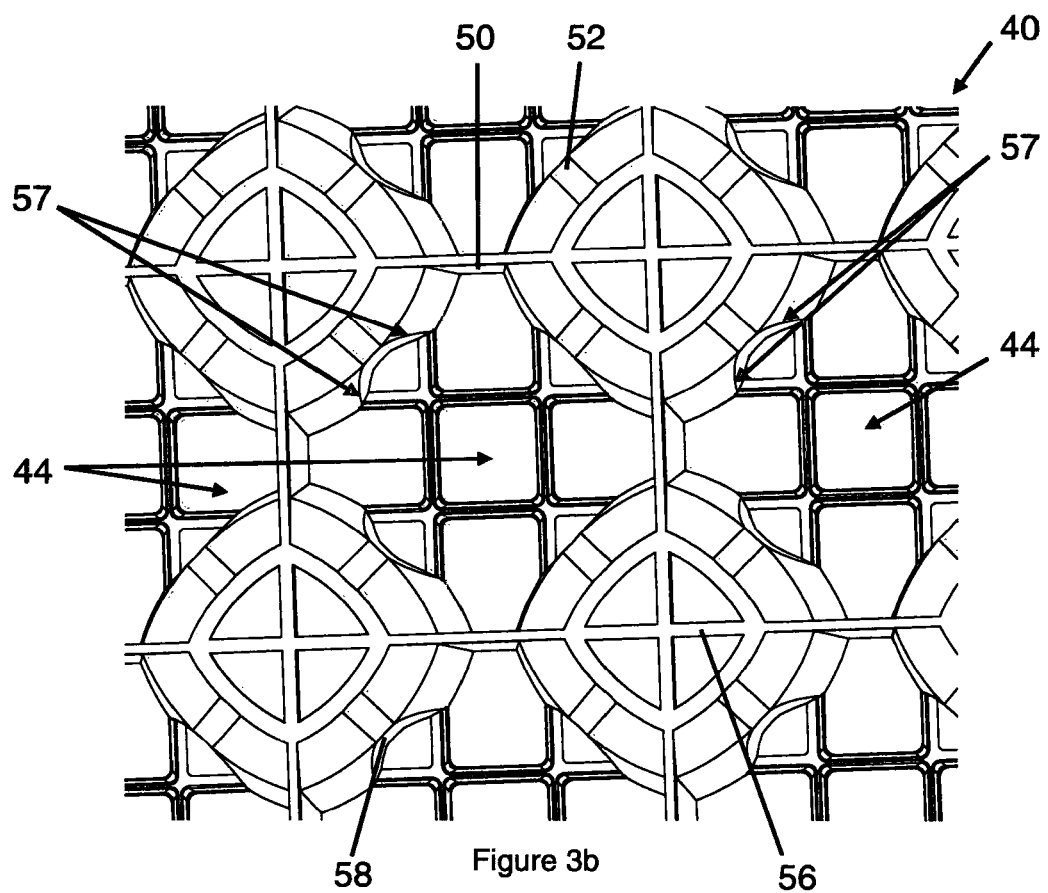
Figure 3C:
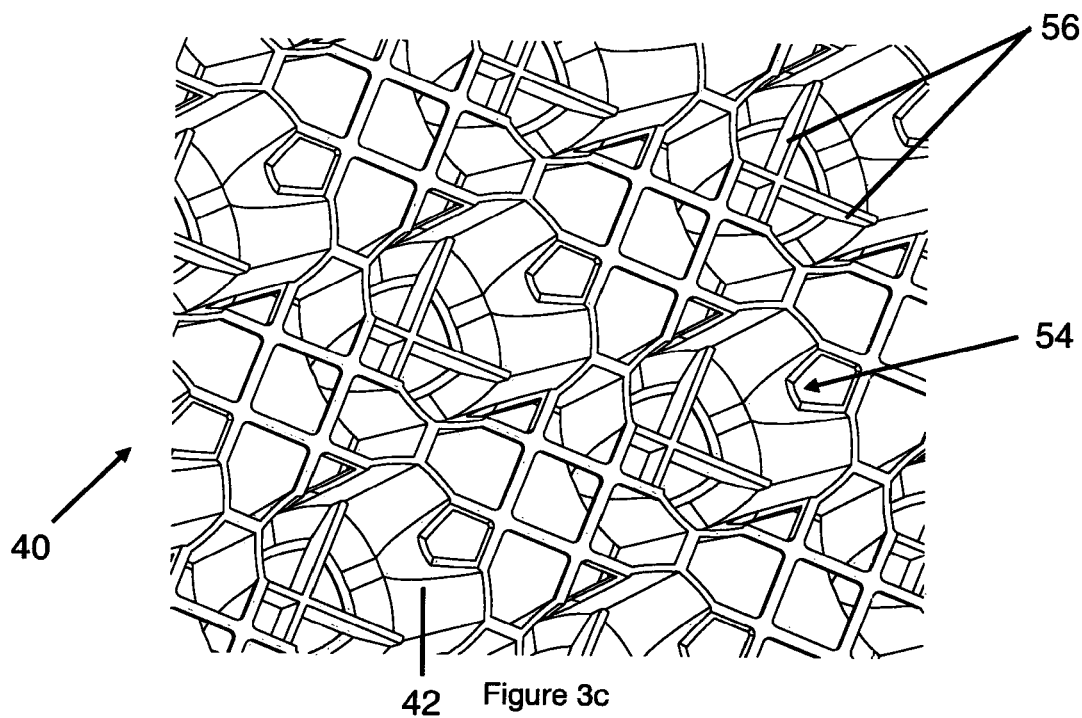
FIG. 3c is a perspective view of the underside of the plant tray in FIGS. 3a and 3b.
Figure 3D:
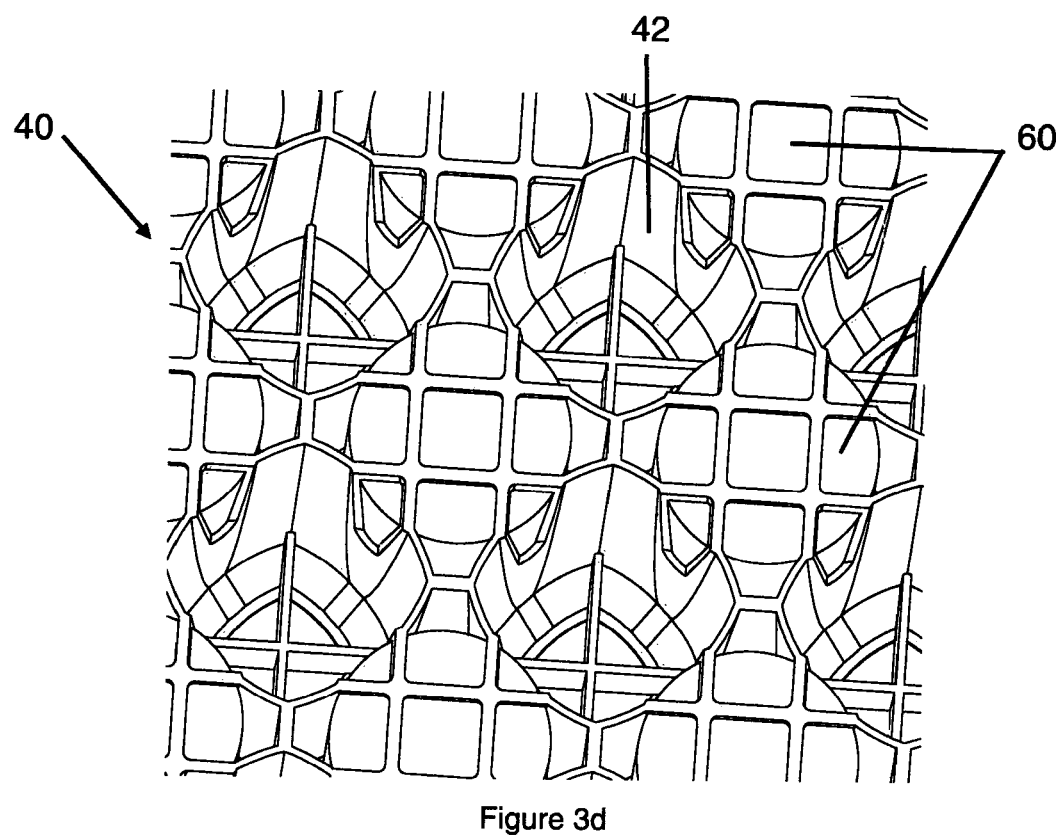
FIG. 3d is a perspective view, from below, of the plant tray in FIGS. 3a to 3c when containing a plurality of stabilised media.

In use, cylindrical stabilised media 60 are inserted into the cells 44 so that the bottom ends of the stabilised media abut the base ribs 48 of the cell base 50, as shown in FIG. 3d. In this position, the cylindrical sides of the stabilised media are in contact with the column wall along the contact edges 57, over the concave portions 58 of each column wall 46 and along the arch-shaped edges of the openings 54. The contact area between a cylindrical stabilised medium 60 and a column wall 46 is therefore roughly shaped like an inverted "Y". When in position, portions of the lower end of the stabilised media protrude through the openings 54 into the interior of the hollow columns 42.

Unlike the trays of the prior art, the columns and the column-connecting walls of the plant tray prevent the free flow of air between cells. While this was previously thought to be disadvantageous, as it may reduce air pruning, the design of the present tray has been found to improve irrigation management by reducing the rate at which water is evaporated from the stabilised media. The columns also greatly reduce the problem of root bridging between neighbouring cells. The columns are also much more physically robust than the upstanding skeletal ribs of the prior art tray in FIGS. 2a and 2b, which is important for the lifespan of the reusable tray.

As shown in FIG. 3d, the stabilised media do not occlude the entire base of each cell, so some air may flow upwards or downwards past the stabilised media. Air flowing through the columns and below the cell base may also flow over the exposed portions of the stabilised media to promote air pruning. By preventing free flow of air laterally through the tray between cells, however, irrigation management and root bridging have been improved while still obtaining satisfactory air pruning.

Figure 3E:
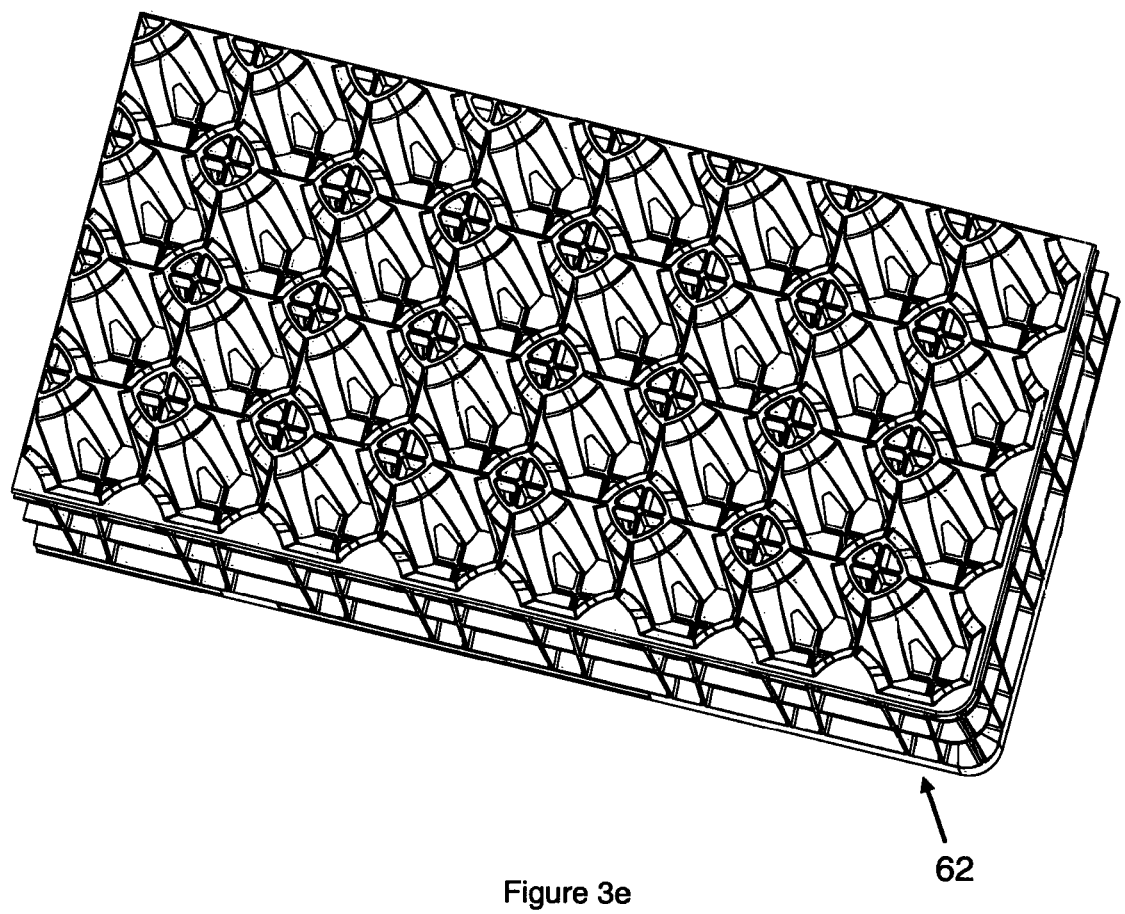
FIG. 3e is a perspective view, from above, of a larger section of the plant tray of FIGS. 3a to 3d.

FIG. 3e shows a 4×8 square array of the cells described above in relation to FIGS. 3a-3d, bounded on two sides by a tray wall 62 which spans the entire height of the tray from the base to the tops of the columns. As the skilled person will appreciate, the tray of the present invention may be adapted to comprise a desired number of cells by varying the size of the array of columns. A preferred tray size may be, for example, 98 or 126 cells.

FIG. 4a-4d illustrate a single cell 100 of a plant tray according to a second preferred embodiment of the present invention. The cell 100 is similar to the cells 44 of the plant tray 40. Instead of two contact edges extending over the entire height of the columns, however, the cell 100 is bounded by inclined column walls 120 which each have an arch-shaped contact edge 130 defining an intersection of the column walls 120 with a virtual cylindrical surface with a diameter of 30 mm in the cell. The arch-shaped edge extends from the cell base upwardly over approximately 85% of the height of the column, with its apex positioned just below a change in the draft angle of the column wall to form an upper chamfered portion 135.

Below the arch-shaped contact edge 130, the arch is spanned by a concave portion 140 which lies on the virtual cylindrical surface. A roughly triangular opening 150 is formed through each column wall in the concave portion 140.

Figure 4A:
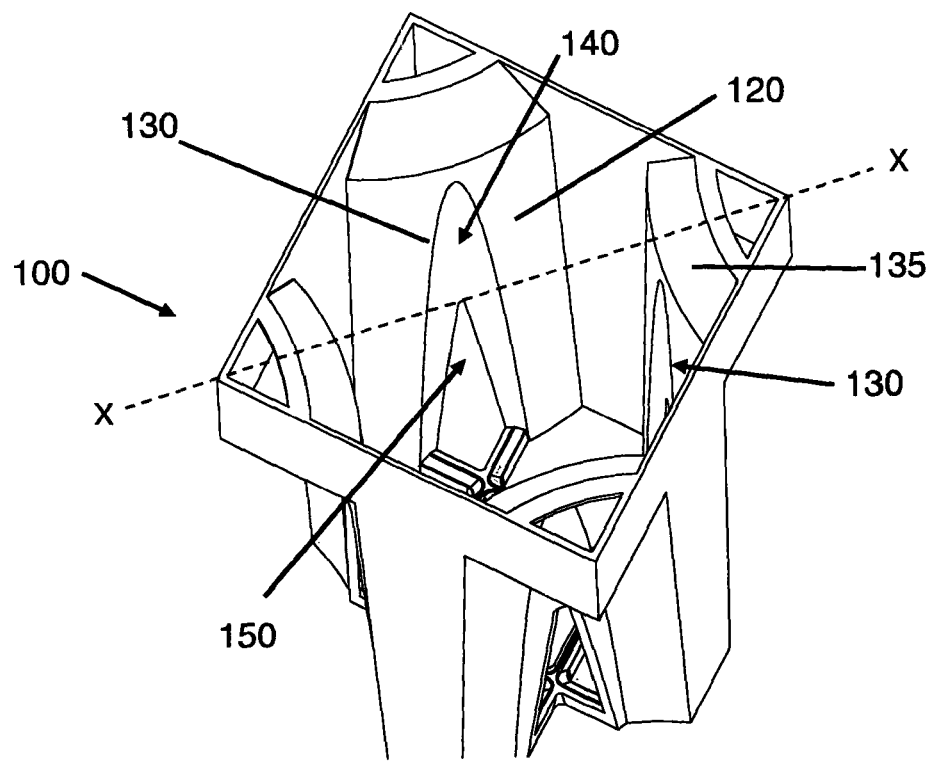
FIG. 4a is a perspective view, from above, of a single cell of a plant tray according to a second preferred embodiment of the present invention.
Figure 4B:
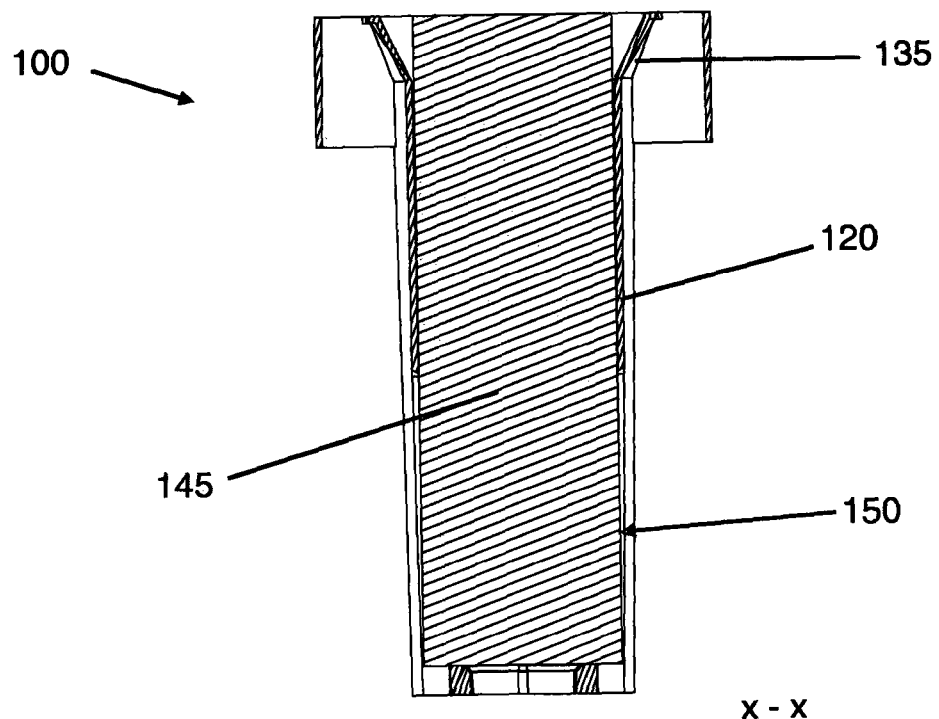

As shown in FIG. 4b, when a cylindrical stabilised medium 145 with a height of 100 mm and a diameter of 30 mm (the same as the virtual cylindrical surface) is positioned in the cell 100, the stabilised medium contacts the column walls 120 along the contact edge 130 and over the surface of the concave portion 140, as indicated by the shaded area in FIG. 4. Lower portions of the stabilised medium project outwards through the openings 150 into the interior of the hollow columns, and the stabilised medium is contacted and supported upright by the column walls.

Figures 4C, 4D:
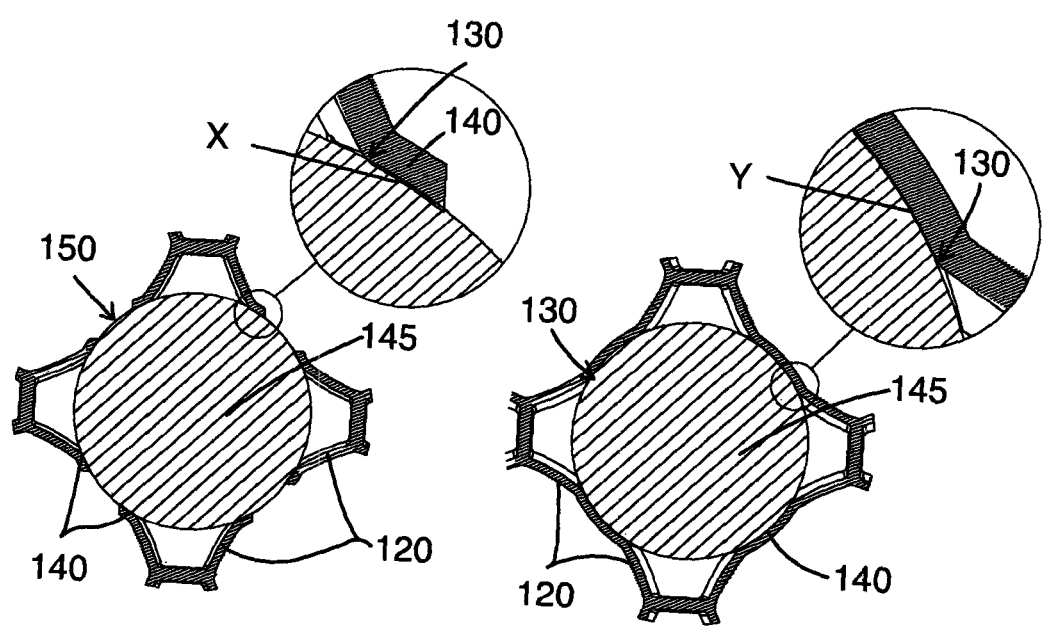
FIG. 4c is a cross-sectional view, taken horizontally through the cell of FIG. 4a at 50% of the opening height.
FIG. 4d is a cross-sectional view, taken horizontally through the cell of FIG. 4a above the opening.
Figure 5A:
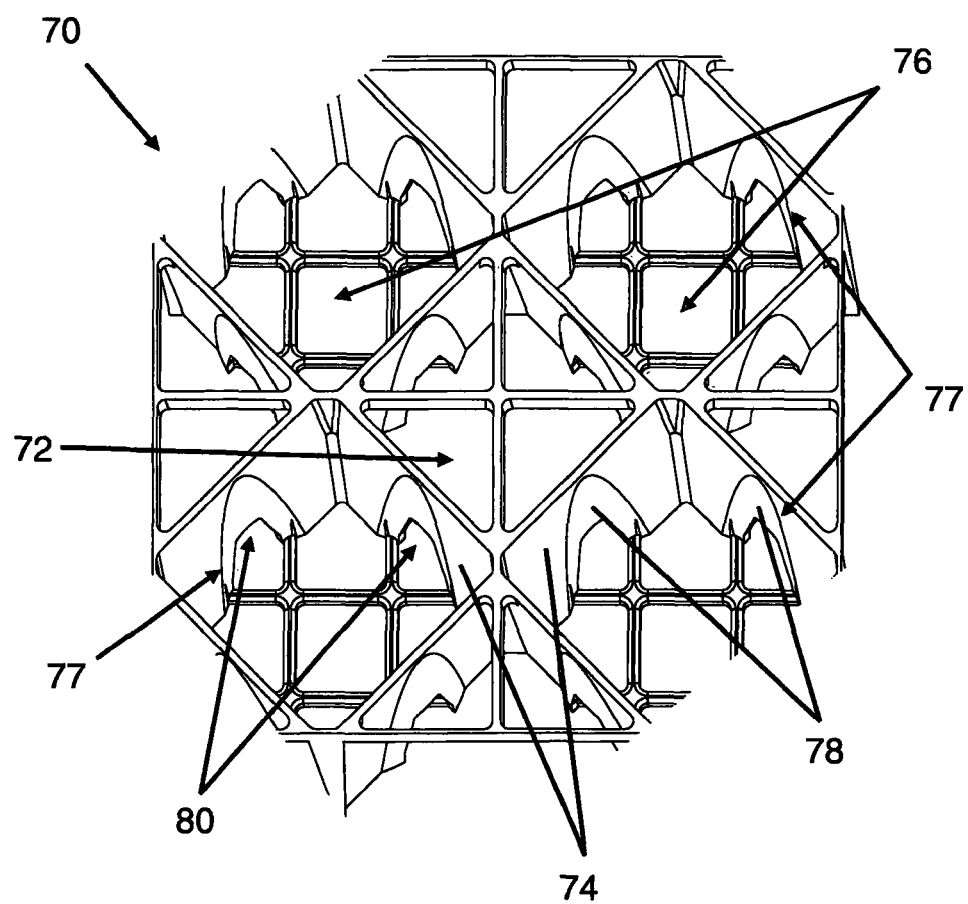
FIG. 5a is a perspective view, from above, of a section of a plant tray according to a third preferred embodiment of the invention.
Figure 5B:
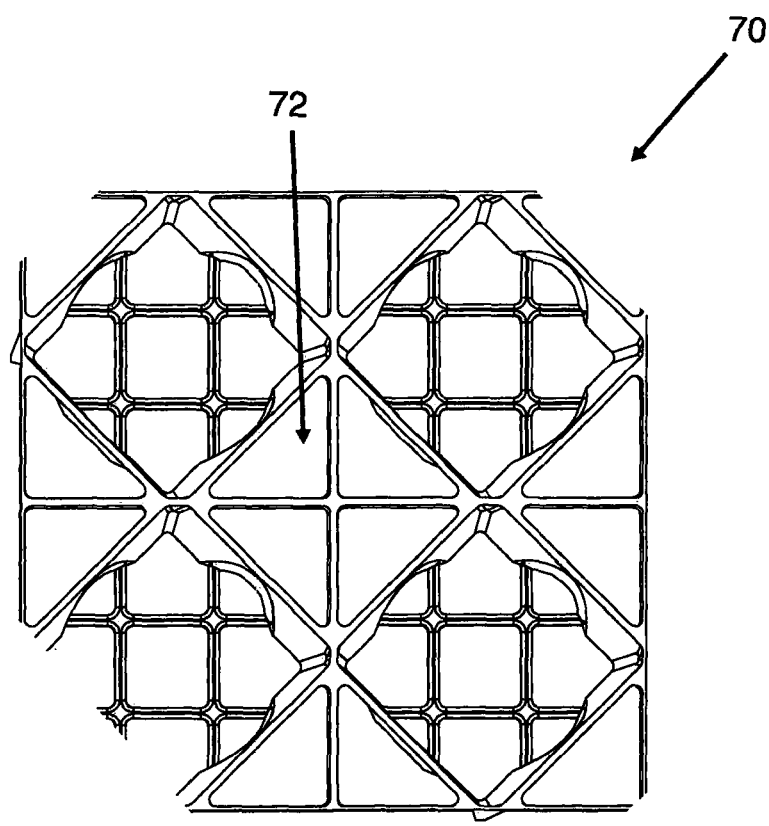
Figure 5C:
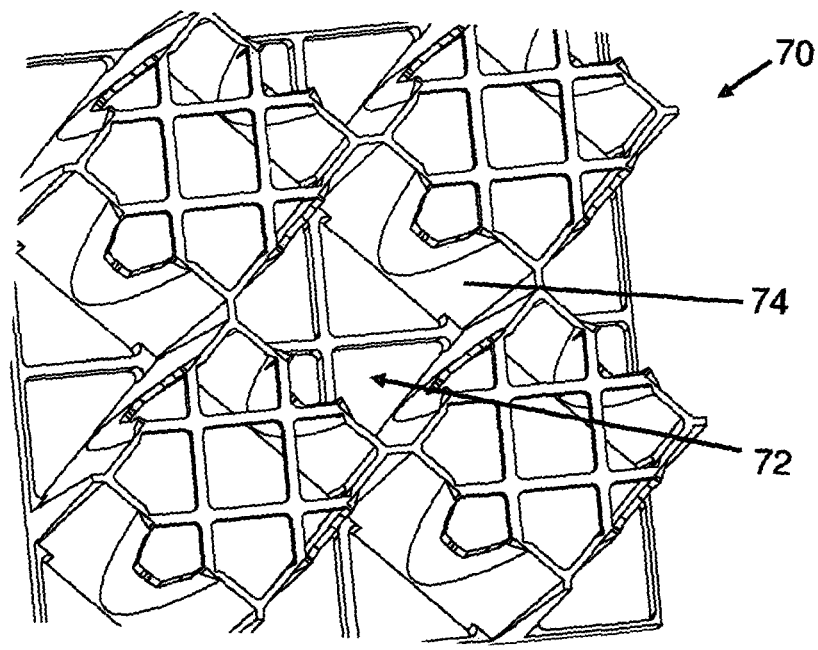
FIG. 5c is a perspective view of the underside of the plant tray in FIGS. 5a and 5b.
Figure 5D:
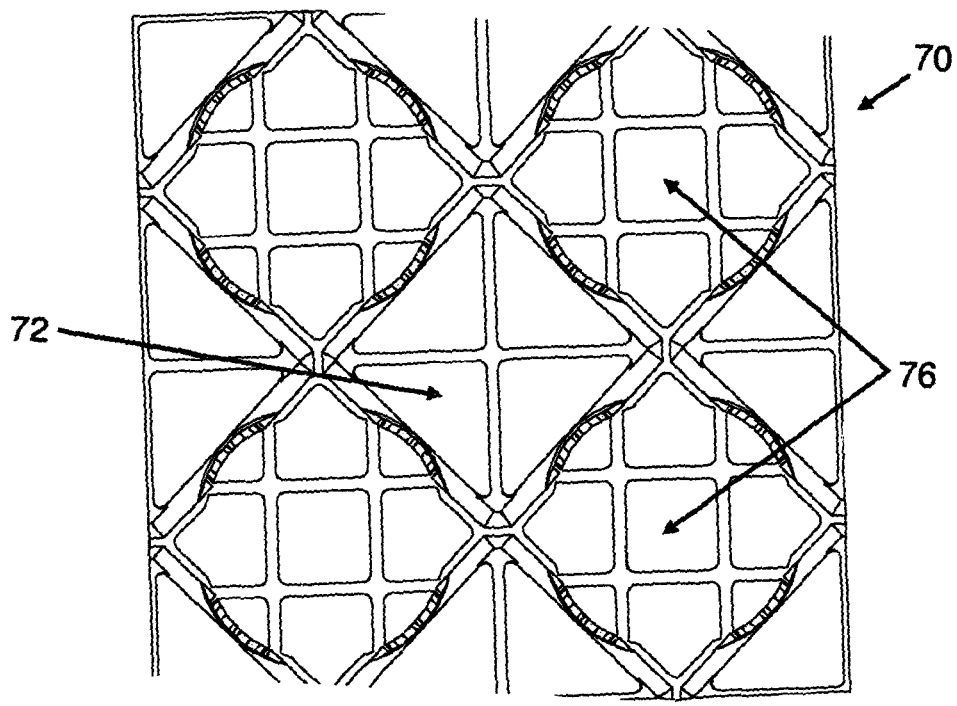
FIG. 5d is a perspective view from almost vertically below the plant tray of FIG. 5a to 5c.

As shown in FIGS. 4c and 4d, the cylindrical stabilised medium 145 is in contact with the column walls 120 within the arch-shaped contact edge 130 and over the concave portion 140.

In FIGS. 4c and 4d:

X=Interference between Stabilised medium and cell sides;

Y=0.02 mm clearance between Stabilised medium and cell sides.

The 0.25 degree draft angle of the concave portion 140 may create a very small gap (for example, around 0.24 mm) between the surface of the stabilised medium and the column wall at the bottom of the chamfered portion. Manufacturing tolerances of stabilised media, and swelling of stabilised media when watered, however, will mean that the stabilised media contacts the column walls over the contact edges and the concave portion.

FIGS. 5a-5d illustrate a plant tray 70 according to a third preferred embodiment of the invention.

The plant tray 70 of FIGS. 5a-5d is similar to the embodiment of FIGS. 4a-4e, except that the frusto-conical columns of FIGS. 4a-4e are replaced with an array of flared frusto-pyramidal columns 72. The frusto-pyramidal columns 72 are arranged in a regular square array, with each column 72 rotated 45 degrees relative to the array, so that adjacent columns contact one another at one vertex. The frusto-conical columns 72 are hollow, open-ended chimneys, which define passages through which air may flow upwards or downwards through the tray.

Each frusto-pyramidal column 72 comprises four inclined column walls 74, each of which forms a cell wall for a different cell 76, and the wide base of the frusto-pyramids arranged at the bottom end of the cells. Thus, each cell 76 is defined by the sides of four frusto-pyramidal columns, so that the shape of the cell is that of an inverted frusto-pyramid.

As described above in relation to FIG. 4, an arch-shaped contact edge 77 is formed by a change in the angle of the column wall 74. A concave portion 78 is formed in each of the column walls 74, so that the arch-shaped contact edge and the surface of the concave portion 78 lie on a virtual cylindrical surface in the cell. Arch-shaped openings 80 are formed within the concave portions 78 and extend upwards form the cell base to approximately 50% of the column height. At the cell base, the openings 80 have a width approximately equal to one third of the column wall 74.

When a cylindrical stabilised medium of appropriate dimension is inserted into a cell 76, the cylindrical sides of the stabilised media contact the arch-shaped edges 77 and the concave portions 78 of each column wall, and portions of the lower end of the stabilised medium protrude through the openings 80 into the interior of the columns 72.

Similarly to the tray of FIGS. 3a-3e, the columns of the plant tray 70 prevent the free flow of air between cells to improve irrigation and reduce the problem of root bridging between neighbouring cells.

Figure 6A:
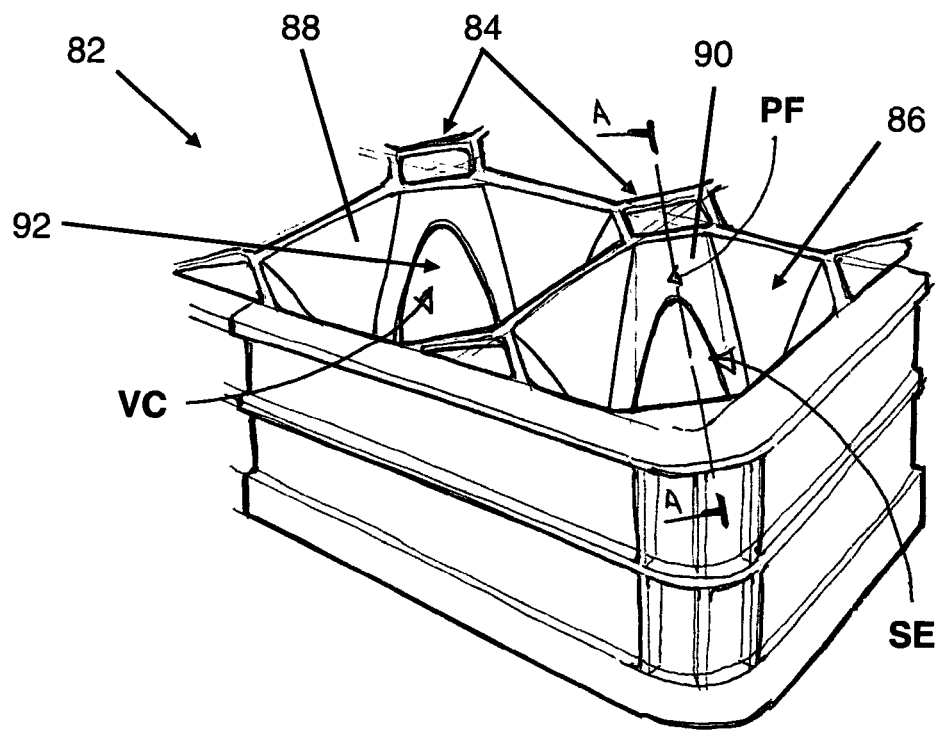
FIG. 6a is a perspective view, from above, of a corner section of a plant-growing tray according to a fourth preferred embodiment of the present invention.
Figure 6B:
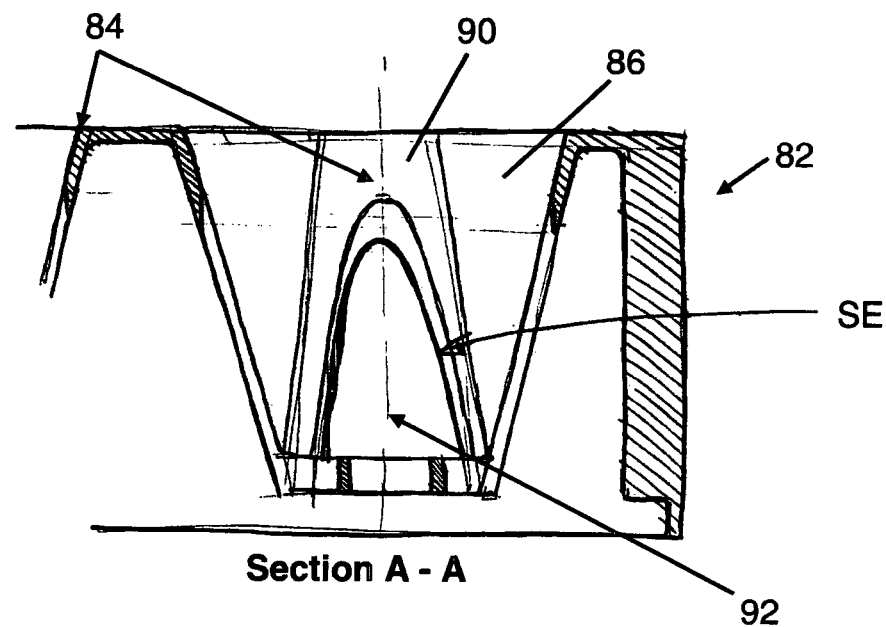
Figure 6C:
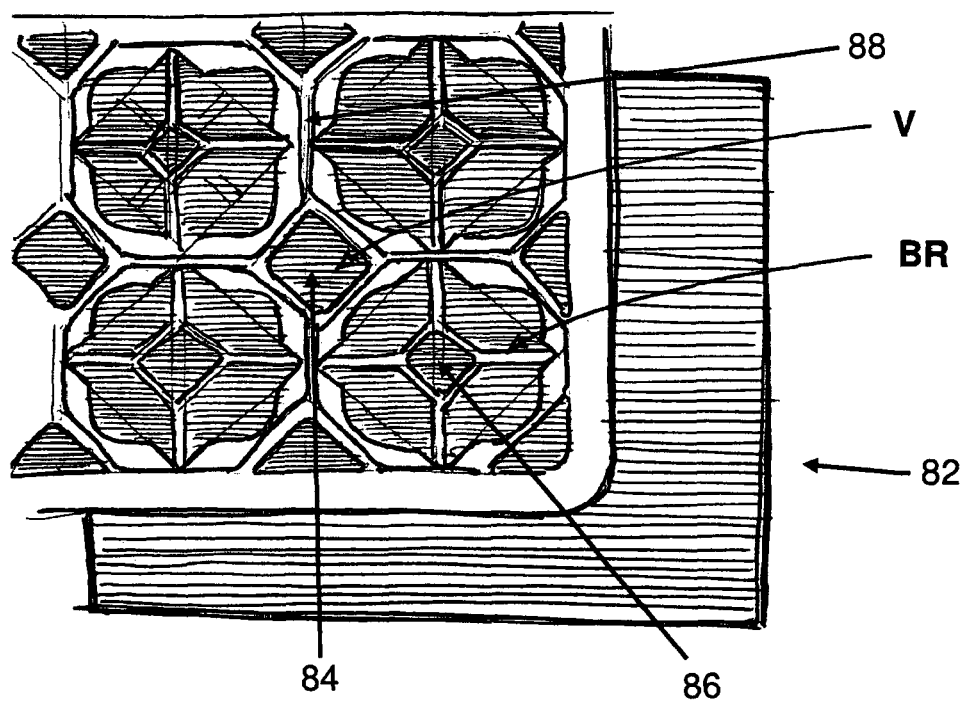
FIG. 6c is a plan view of the section of plant-growing-tray of FIGS. 6a and 6b.

FIG. 6a-6c illustrate a section of a plant-growing tray 82 according to a fourth preferred embodiment of the present invention.

In FIGS. 6a-6c:

PF=Pyramid faces (4 per cell) taper towards base;
SE=Support edges for Ellepot;
VC=Vertical cylindrical cut generates support for Ellepot;
V=Ventilation;
BR=Base rib structure.

Plant-growing tray 82 is similar to plant tray 70 shown in FIGS. 5a-5d. A square array of hollow, open-ended frusto-pyramidal columns, or chimneys, 84 defines a square array of cells 86 therebetween. Compared to the columns 72, however, the frusto-pyramidal columns have a greater draft angle, so that the upper ends of adjacent columns 84 are further apart and are connected by column-connecting walls 88. Inclined walls 90 of the columns 84 and column-connecting walls 88 form cell walls, so that the cells 86 have an upper end with an octagonal shape, tapering to a lower end with a square shape at the cell base.

An arch-shaped opening 92 extends from the lower end of each column wall 90 to an apex approximately 80% of the way up the column wall. The edge of the arch-shaped opening forms an arch-shaped contact edge which follows the intersection of the cell walls with a virtual cylindrical surface. Thus, when a cylindrical stabilised medium is inserted into the cell 86, the stabilised medium contacts the arch-shaped contact edge of the opening 92, and is supported in an upright position.

Figure 7A:
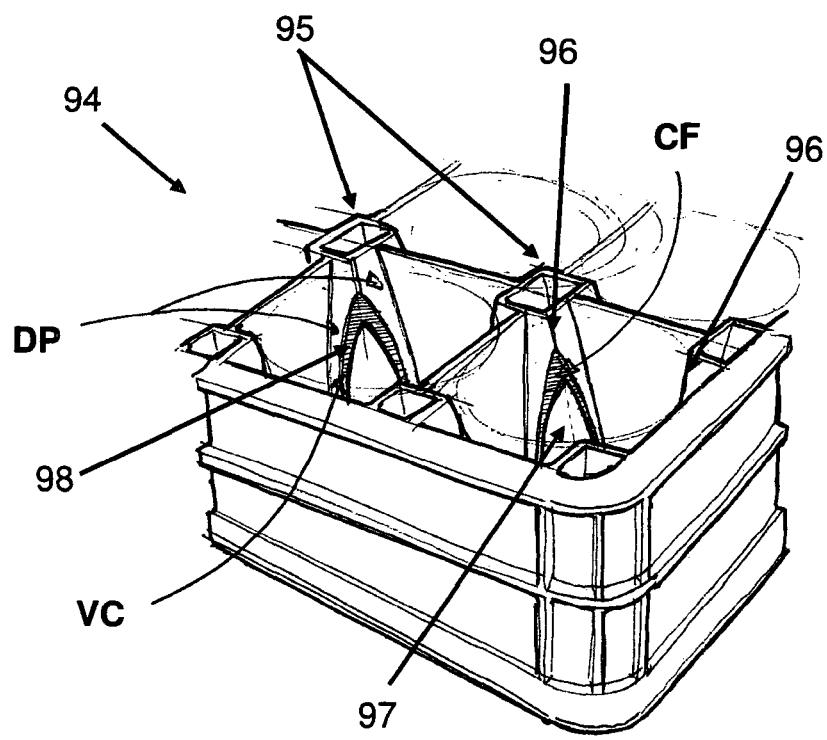
FIG. 7a is a perspective view, from above, of a section of a plant-growing tray according to a fifth preferred embodiment of the present invention.
Figure 7B:
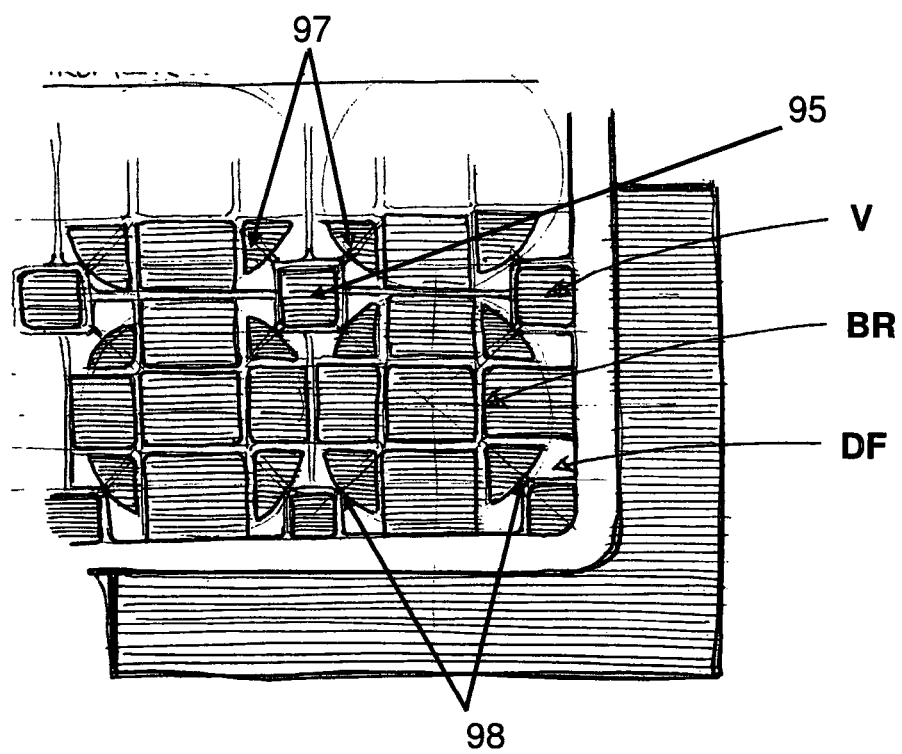

FIG. 7a-7b illustrate a section of a plant-growing tray 94 according to a fifth preferred embodiment of the present invention.

In FIGS. 7a and 7b:

CF=contact face with Ellepot;
VC=Vertical cylindrical cut to accept Ellepot;
DP=Drafted 'pyramid' faces;
V=ventilation;
BR=Base rib structure;
DF=Drafted faces create "pyramid" form toward cell base.

The plant-growing tray 94 of FIGS. 7a and 7b is similar to the plant tray 82 shown in FIG. 6a-6c, with the frusto-pyramidal columns 95 rotated through 45 degrees relative to the array of cells, so that each of the four vertices 96 of each column protrude into a different cell.

In order to accommodate a cylindrical stabilised medium, an arch-shaped opening 97 is formed through each column vertex 96. The edges of the opening 97 thus form contact-edges 98 defining the intersection between two walls and a vertex of the column 95 with a virtual cylindrical surface in the cell. Thus, when a cylindrical stabilised medium is inserted into the cell, the stabilised medium contacts the contact edges 98 of the opening 97, and is supported in an upright position in the centre of the cell.

Figure 8:
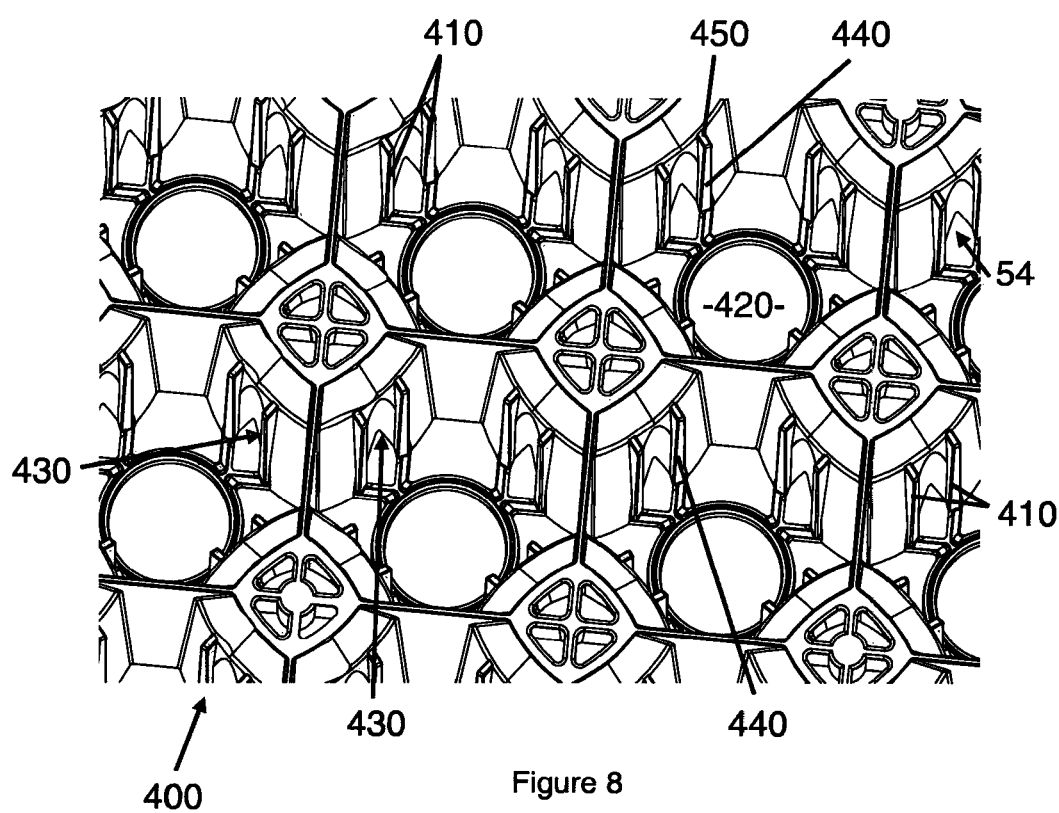
FIGS. 8 and 9 are perspective views of a plant-growing tray according to a sixth preferred embodiment of the invention.
Figure 9:
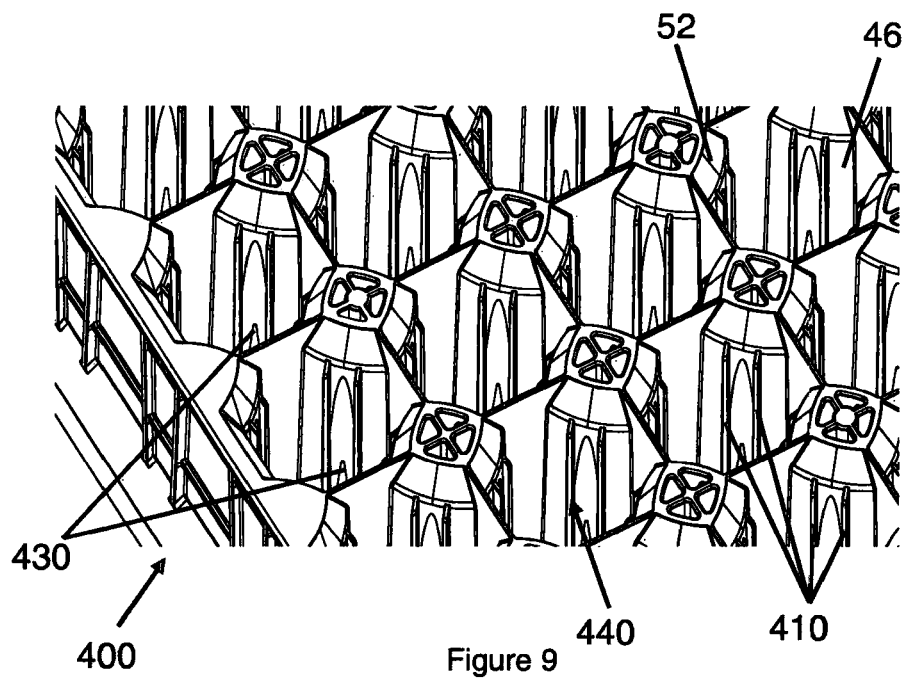

FIGS. 8 and 9 show an embodiment of a plant tray 400 which is similar to that described above in relation to FIGS. 3a to 3e. In the embodiment of FIG. 8, however, the plant tray 400 additionally comprises four pairs of vertical ribs 410 arranged to project into each cell.

As with the plant tray 40 of FIGS. 3a to 3e, four columns 42 surround each cell 420, and each convex column wall 46 forms a cell wall.

The arch-shaped edges 430 of the openings 54 in the column walls 46 lie on the virtual cylindrical surface in the cell, and thus form contact edges for contacting a cylindrical stabilised medium positioned in the cell.

A pair of vertical ribs 410 projects into the cell 420 from each column wall 46. One rib is positioned on either side of the openings 54, so that the openings 54 and the concave portions 58 are positioned between two ribs. The ribs project from the column walls 46 into the cell, so that the innermost face 440 of each rib is substantially vertical. As the walls of the columns 42 are inclined, this means that in order to provide the vertical face 440 the top end of each rib extends further from the column wall than the bottom end.

The ribs 410 extend from the column base, to the bottom of the upper portion 52 of the columns. The top surface 450 of each rib is level with the lower end of the chamfered upper portion 52, and the top surface of each rib is angled at substantially the same draft angle as the chambered upper portion.

The vertical innermost face 440 of the ribs 410 are angled relative to the column wall, so that the faces 440 follow the virtual cylindrical surface in the cell even though the ribs are not arranged radially around the virtual cylindrical surface. This may advantageously mean that when a cylindrical stabilised medium is inserted into a cell, the outer surface of the stabilised medium contacts both the vertical faces 440 of the ribs 410, and the contact edges 430 formed around the openings 54. By supporting the stabilised medium with both the contact edges 430 and the vertical ribs 410, the likelihood of the stabilised medium tilting out of its intended upright position may be reduced.

Figure 10:
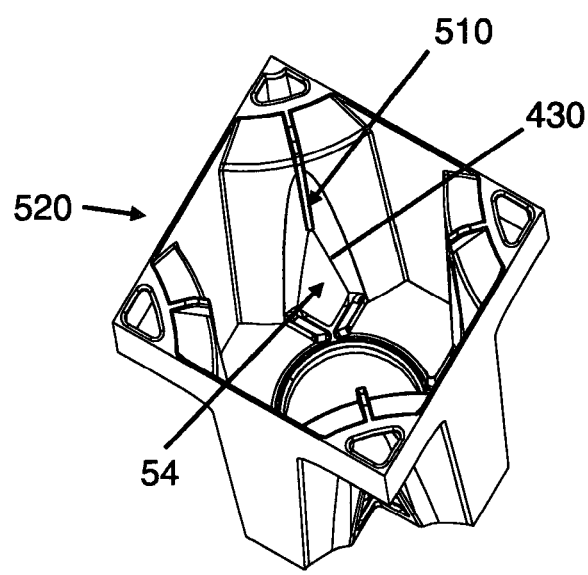
FIG. 10 is a perspective view of a cell of a plant-growing tray according to a seventh preferred embodiment of the invention.

FIG. 10 shows an alternative embodiment of a cell 520 for a plant-growing tray. The cell 520 of FIG. 10 is similar to that described above in relation to FIGS. 3a to 3e, 8 and 9. In the embodiment of FIG. 10, however, the cell 520 comprises four vertical ribs 510.

As with the plant tray 400 of FIGS. 8 and 9, the arch-shaped edges 430 of the openings 54 in the column walls 46 lie on the virtual cylindrical surface in the cell, and thus form contact edges for contacting a cylindrical stabilised medium positioned in the cell.

In the cell 520, however, vertical ribs 510 are positioned above each of the openings 54 through the walls of the four columns. The vertical ribs extend upwards from the apex of the openings 54 to the top of the cell. The upper end of the ribs 520 are rounded so that stabilised media may be inserted into and removed from the cell without snagging on the ribs.

By providing ribs 510 above the arch-shaped edges 430 of the openings 54, the innermost faces of the ribs may advantageously lie on the same virtual cylindrical surface as the arch-shaped edges. The ribs 520 may advantageously contact and support a cylindrical stabilised medium at a higher position than the arch-shaped contact edges 430, helping to keep the stabilised medium in its intended upright and central position in the cell.

The invention claimed is:

1. A plant-growing tray for containing cylindrical stabilised media for growing plants, the tray comprising:
   an array of flared columns, a lower end of the columns being wider than an upper end;
   in which the columns define an array of cells therebetween for containing cylindrical stabilised media; and
   in which a column comprises an arch-shaped contact edge defined by an intersection between a wall of the flared column and a virtual cylindrical surface in a cell, such that the contact edges are suitable for contacting a cylindrical stabilised medium positioned in the cell.

2. A plant-growing tray according to claim 1, in which one or more flared columns are open-ended chimneys defining passages through which air may flow.

3. A plant-growing tray according to claim 2, in which the arch-shaped contact edge extends upwardly over the column, and in which the width of the arch-shaped contact edge widens towards the lower end of the column.

4. A plant-growing tray according to claim 1, in which the column comprises a concave portion below the arch-shaped contact edge, optionally in which the concave portion has a curvature equal to that of the virtual cylindrical surface.

5. A plant-growing tray according to claim 1, in which the contact edge extends upwardly over at least 40% 50%, or 60%, or 70%, or 80%, or 90% of the height of the column, optionally over the entire height of the column.

6. A plant-growing tray according to claim 1, in which one or more columns is hollow and comprises one or more openings through the wall of the column, the edges of the openings being configured to lie on the virtual cylindrical surface in the cell, optionally in which the edge of an opening forms a contact edge for contacting a cylindrical stabilised medium positioned in the cell.

7. A plant-growing tray according to claim 6, in which the column comprises one or more arch-shaped openings through its wall, and in which the arch-shaped openings widen towards the lower end of the column and/or in which the one or more openings are positioned between two contact edges on the same column wall, optionally in which the opening spans the distance between two contact edges; and/or in which the one or more openings are formed through a vertex of the column.

8. A plant-growing tray according to claim 6, in which a wall of the column defines a cell side wall and comprises an opening, and in which the area of the opening occupies less than 75% of the area of the column wall, or less than 50%, or 40%, or 30%, or 20%, or 10% of the area of the column wall; and/or in which the openings in the columns extend upwardly from a cell base over a portion of the column that is greater than an equal to 25%, or 30%, or 40% of the height of the columns, and less than or equal to 45%, or 50%, or 60%, of the height of the columns.

9. A plant-growing tray according to claim 1, in which the flared columns comprise a circular cross-section, or a square cross section, or a polygonal cross section.

10. A plant-growing tray according to claim 1, in which the columns comprise a plurality of convex walls configured to form cell walls, or in which the columns comprise a plurality of flat walls configured to form cell walls.

11. A plant-growing tray according to claim 1, in which the two sides of the arch-shaped contact edge form two contact edges positioned on column walls either side of a vertex of the flared column, and in which the portion of the vertex between the contact edges is configured to define an intersection between the walls of the flared column and a virtual cylindrical surface in a cell.

12. A plant-growing tray according to claim 1, in which an upper portion of the flared columns is chamfered, such that the chamfered columns define a widened upper portion of the cells, optionally in which the chamfered upper portions of the columns extend over greater than or equal to 5%, or 10%, or 15%, and less than or equal to 18%, or 20%, or 25%, of the height of the columns.

13. A plant-growing tray according to claim 1, comprising a plurality of column-connecting walls configured to connect adjacent columns to one another.

14. A plant-growing tray according to claim 13, in which the column-connecting walls are configured to connect the upper ends of adjacent columns to one another, such that the column-connecting walls form a tray top on top of which a similar tray may be stacked; or in which the lower ends of the flared columns are hollow and the column-connecting walls are configured to connect the lower ends of adjacent columns to one another and to extend upwardly from the lower end over a portion of the column that is greater than or equal to 10%, or 20%, or 30% of the height of the columns, and less than or equal to 40%, or 50%, or 60% of the height of the columns, such that the upper ends of the flared columns may be nested underneath the flared columns of a similar try.

15. A plant-growing tray according to claim 1, in which the flared columns have an angle of taper which varies along their height.

16. A plant-growing tray according to claim 1, comprising one or more projections facing into the cell, configured in use to contact the cylindrical stabilised medium positioned in the cell; optionally in which the projections are configured in use to contact an upper portion of the stabilised medium; and/or in which at least a portion of the projections is configured to contact the cylindrical medium at a greater height than the one or more contact edges; and/or in which the projections comprise vertical ribs.

* * * * *